United States Patent [19]
Nakagawa et al.

[11] Patent Number: 5,703,704
[45] Date of Patent: Dec. 30, 1997

[54] STEREOSCOPIC IMAGE INFORMATION TRANSMISSION SYSTEM

[75] Inventors: Akira Nakagawa; Eishi Morimatsu; Makiko Konoshima; Kiichi Matsuda, all of Kawasaki, Japan

[73] Assignee: Fujitsu Limited, Kawasaki, Japan

[21] Appl. No.: 591,915

[22] Filed: Jan. 25, 1996

Related U.S. Application Data

[63] Continuation of Ser. No. 88,347, Jul. 9, 1993, abandoned.

[30] Foreign Application Priority Data

Sep. 30, 1992 [JP] Japan ................... 4-262069

[51] Int. Cl.$^6$ .................. G03H 1/08; G03H 1/26; H04N 1/415; H04N 7/12
[52] U.S. Cl. .................. 359/9; 359/23; 348/403; 358/432
[58] Field of Search ................... 359/26, 29, 9, 359/466, 559, 21, 22, 23; 358/133, 432; 348/403

[56] References Cited

U.S. PATENT DOCUMENTS

| | | | |
|---|---|---|---|
| 3,608,993 | 9/1971 | DeBitetto | 359/23 |
| 4,104,489 | 8/1978 | Satoh et al. | 369/103 |
| 4,701,006 | 10/1987 | Perlmutter | 350/3.66 |
| 4,778,262 | 10/1988 | Haines | 350/3.66 |
| 4,969,700 | 11/1990 | Haines | 359/32 |
| 4,983,003 | 1/1991 | Wreede et al. | 350/3.61 |
| 5,111,313 | 5/1992 | Shires | 359/17 |
| 5,168,375 | 12/1992 | Reisch | 358/432 |

FOREIGN PATENT DOCUMENTS

| | | |
|---|---|---|
| 0 204 006 | 12/1986 | European Pat. Off. . |
| 1 278 672 | 6/1969 | United Kingdom . |
| 1 384 963 | 4/1972 | United Kingdom . |
| 0 222 918 | 5/1987 | United Kingdom . |
| 2 198 310 | 6/1988 | United Kingdom . |
| WO 90/04218 | 4/1990 | WIPO . |

OTHER PUBLICATIONS

Yatagai, T., *Stereoscopic Approach to 3–D Display Using Computer–Generated Holograms*, Applied Optics, vol. 15, No. 11, Nov. (1976), pp. 2722–2729.

Takahashi et al., *Computer Generated Holograms for Testing Aspheric Lenses*, Applied Optics, vol. 15, No. 2, Feb. (1976), pp. 546–549.

Spiegel, Murray R., *Mathematical Handbook of Formulas and Tables*, McGraw–Hill, New York, 1968, pp. 174–176.

*Primary Examiner*—Paul M. Dzierzynski
*Assistant Examiner*—Audrey Chang
*Attorney, Agent, or Firm*—Armstrong, Westerman, Hattori, McLeland & Naughton

[57] ABSTRACT

A stereoscopic image information transmission system which combines into one unit the information source coding means of the stereoscopic image, which was indispensable at the transmission side in conventional systems, and the interference fringe generating means, for generating the interference fringes expressing the stereoscopic image, into one by an image processing means utilizing a specific conversion rule effective for information compression, whereby it becomes possible to eliminate the information source decoding means which had been required at the reception side in conventional systems, which system thereby enables the hardware on the transmission side to be made much smaller and which enables the load on the transmission line from the transmission side to the reception side to be lightened.

16 Claims, 30 Drawing Sheets

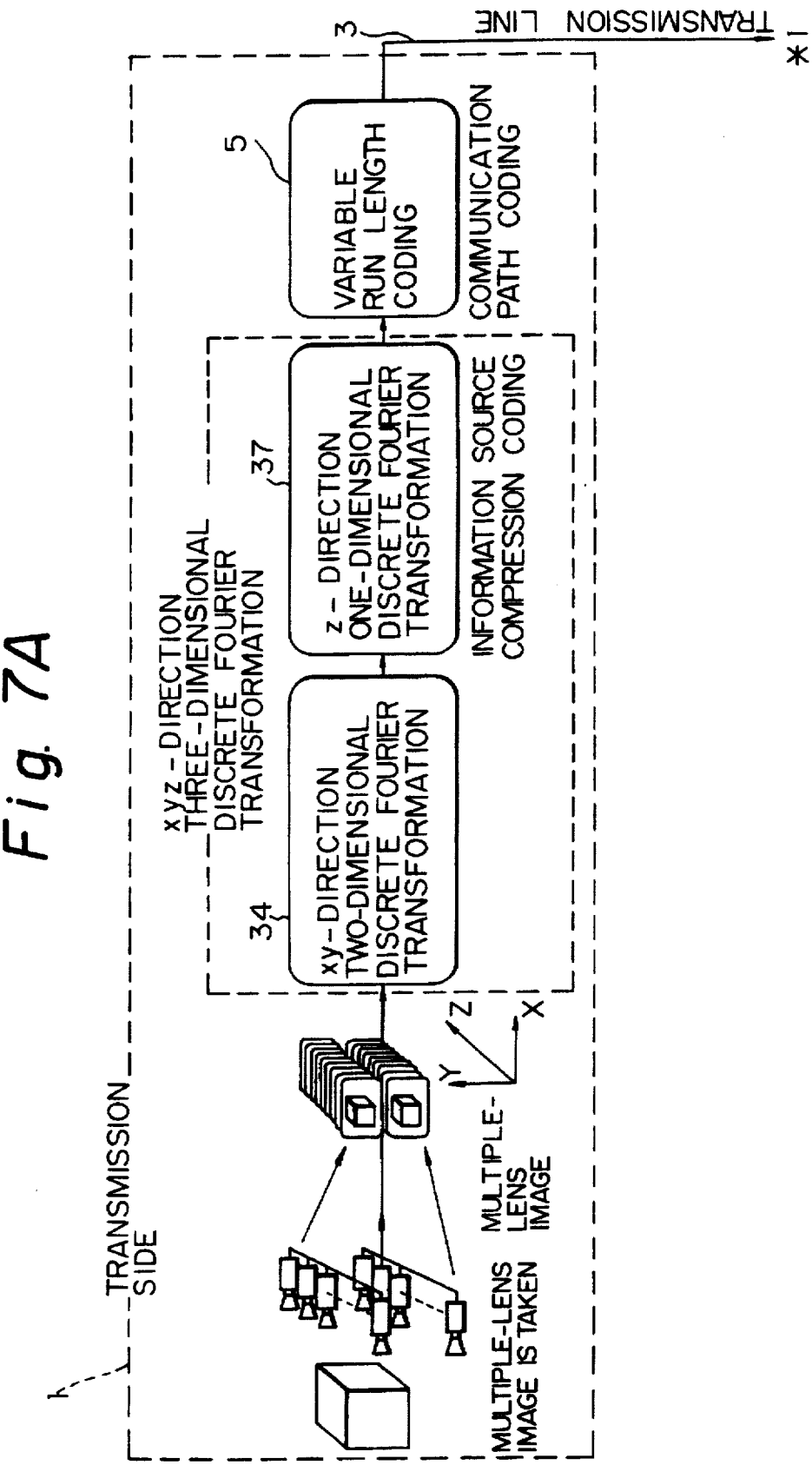

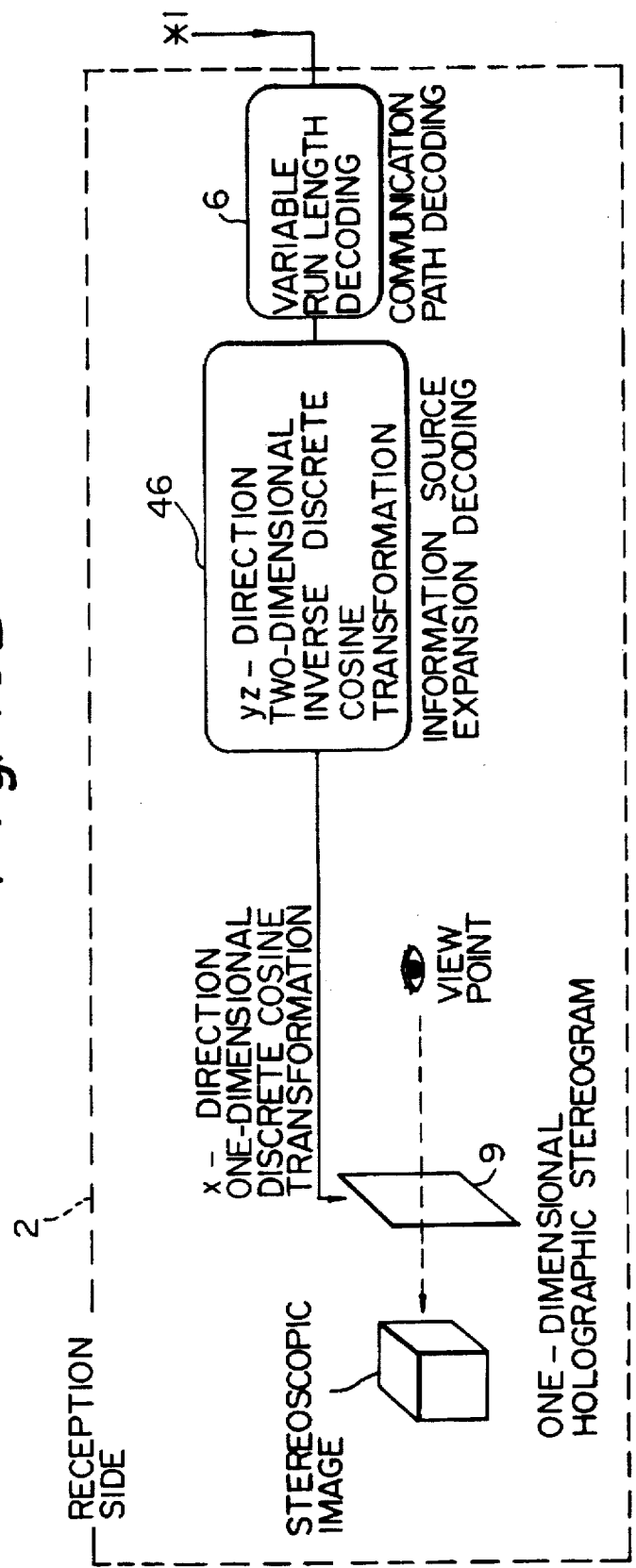

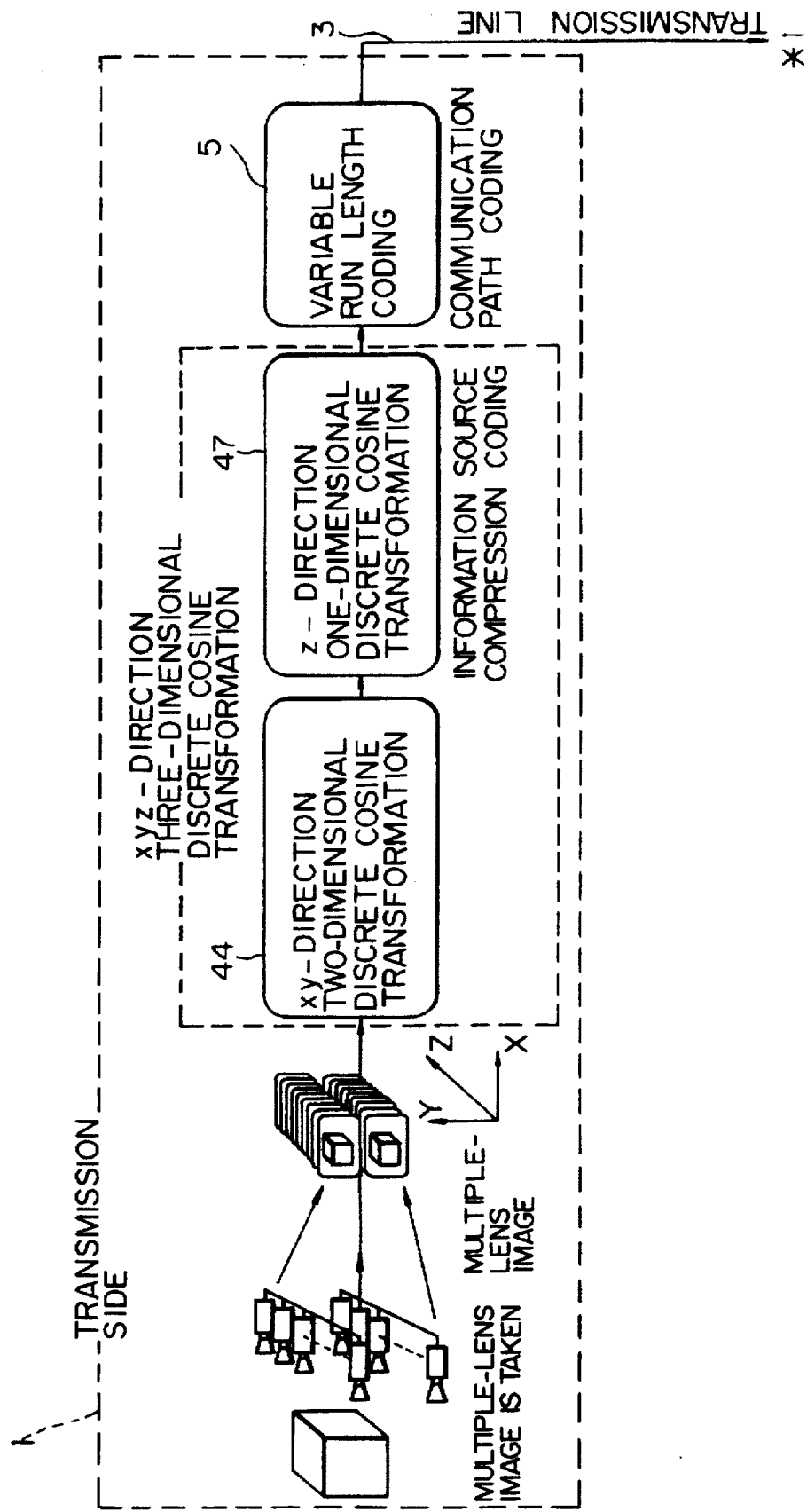

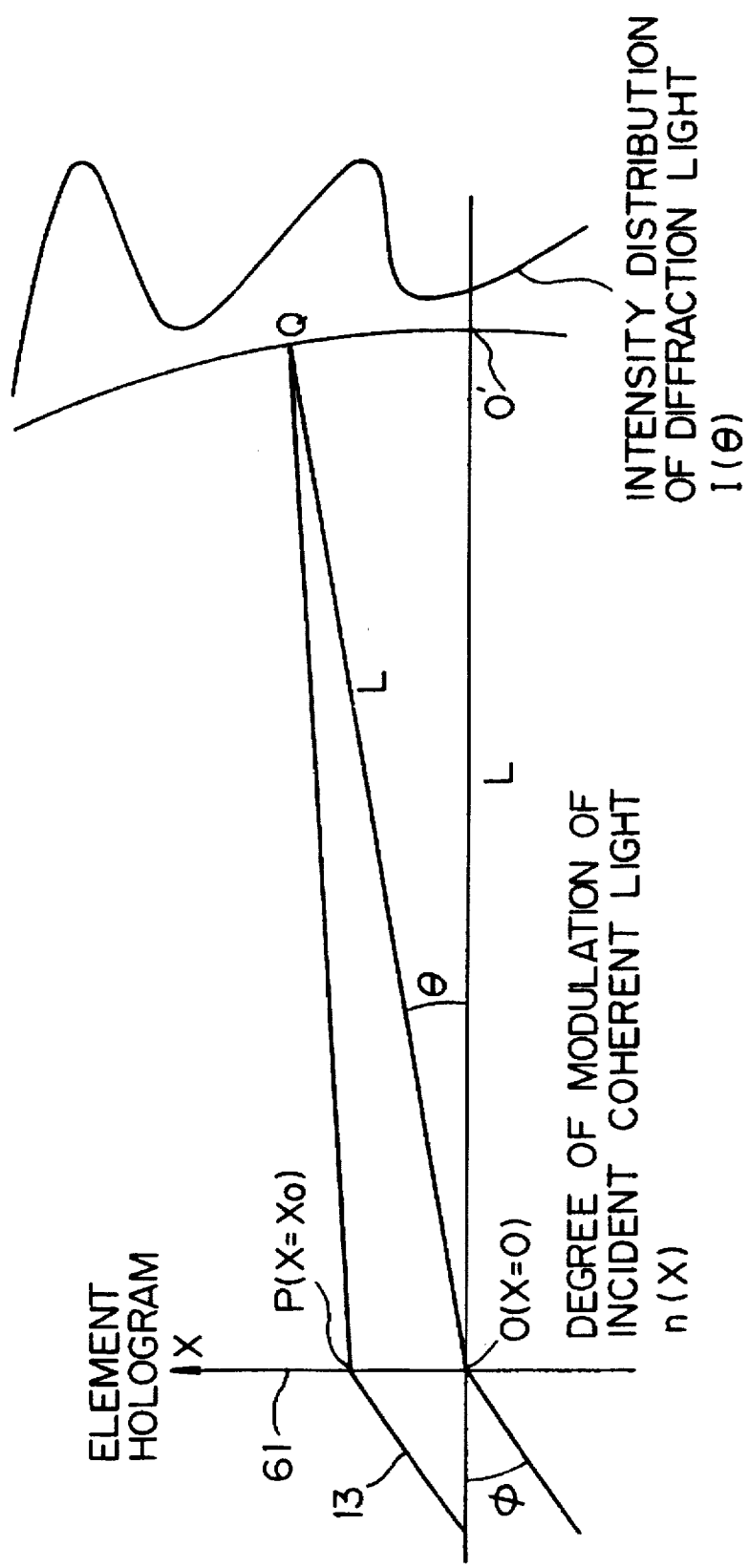

STEREOSCOPIC IMAGE INFORMATION TRANSMISSION SYSTEM

This application is a continuation of application Ser. No. 08/088,347, filed Jul. 9, 1993, now abandoned.

BACKGROUND OF THE INVENTION

1. Field of the Invention

The present invention relates to a stereoscopic image information transmission system.

One of the technologies now being widely researched with the aim of visually reproducing stereoscopic images is holographic stereograms. Holographic stereograms are comprised of an array of a plurality of element holograms. Each of these element holograms is loaded with a unique modulation value corresponding to the stereoscopic image to be reproduced. By irradiating these element holograms with coherent light, the stereoscopic image is visually reproduced.

Sources for the information for such stereoscopic images include, for example, the three-dimensional image information used in CAD and multiple-lens image information. The volume of this image information, however, is tremendous and therefore no practical stereoscopic image information transmission system able to transfer such stereoscopic image information has yet been realized with just the combination of existing technologies.

The present invention relates to a stereoscopic image information transmission system suitable for practical use.

2. Description of the Related Art

As explained later in detail, in one example of a conventional stereoscopic image information transmission system (FIG. 1), an interference fringe generating means performs a predetermined calculation operation on the three-dimensional or multiple-lens image information received from a transmission side so as to obtain modulation values (interference fringes) to be loaded in the hologram. Further, in a second example of a conventional stereoscopic image information transmission system (FIG. 2), the interference fringe generating means is removed from the reception side and placed at the transmission side.

A look at the first example (FIG. 1) shows that there is a problem with the interference fringe generating (calculating) means provided at the reception side. The calculation of the interference fringes for generating the stereoscopic image information requires a huge amount of operations and therefore a special computer is needed. For example, when considering a broadcast service network, it would be necessary to install a special computer in each receiving household. Cost-wise, this is almost completely impractical.

This being the case, it becomes necessary to install the interference fringe generating means at the transmission side. This is the case of the system of the second example (FIG. 2). There, the interference fringe generating means is provided at the transmission side.

If the interference fringe generating means is provided at the transmission side, two problems arise, however.

The first problem is that the hardware on the transmission side becomes huge in size. The reason is that there is generally little correlation in the information of the interference fringes and therefore compression of the amount of information becomes difficult, so the information source coding means and the communication path coding means become complicated and large in size.

The second problem is that the load on the transmission side become extremely heavy. In view of the multiplex use of transmission lines, the rate of utilization becomes extremely poor.

SUMMARY OF THE INVENTION

Therefore, the present invention, in consideration of the above problems, has as its object the provision of a stereoscopic image information transmission system which enables the hardware on the transmission side to be made much smaller and which enables the load on the transmission line to be lightened.

To attain the above-mentioned object, the system of the present invention combines the information source coding means of the stereoscopic image, which was indispensable at the transmission side in conventional systems, and the interference fringe generating means, for generating the interference fringes expressing the stereoscopic image, into one by an image processing means utilizing a specific conversion rule effective for information compression, whereby it becomes possible to eliminate the information source decoding means which had been required at the reception side in conventional systems.

BRIEF DESCRIPTION OF THE DRAWINGS

The above object and features of the present invention will be more apparent from the following description of the preferred embodiments with reference to the accompanying drawings, wherein:

FIGS. 10A and 10B are views showing a more specific example of the structure of FIG. 8, FIGS. 11A and 11B are views showing a more specific example of the structure of FIG. 9, FIG. 24 is a view explaining the compensation of the degree of modulation of the index of refraction.

DESCRIPTION OF THE PREFERRED EMBODIMENTS

Before describing the embodiments of the present invention, the prior art and the problems therein will be first described with reference to the related figures.

Figure 1:
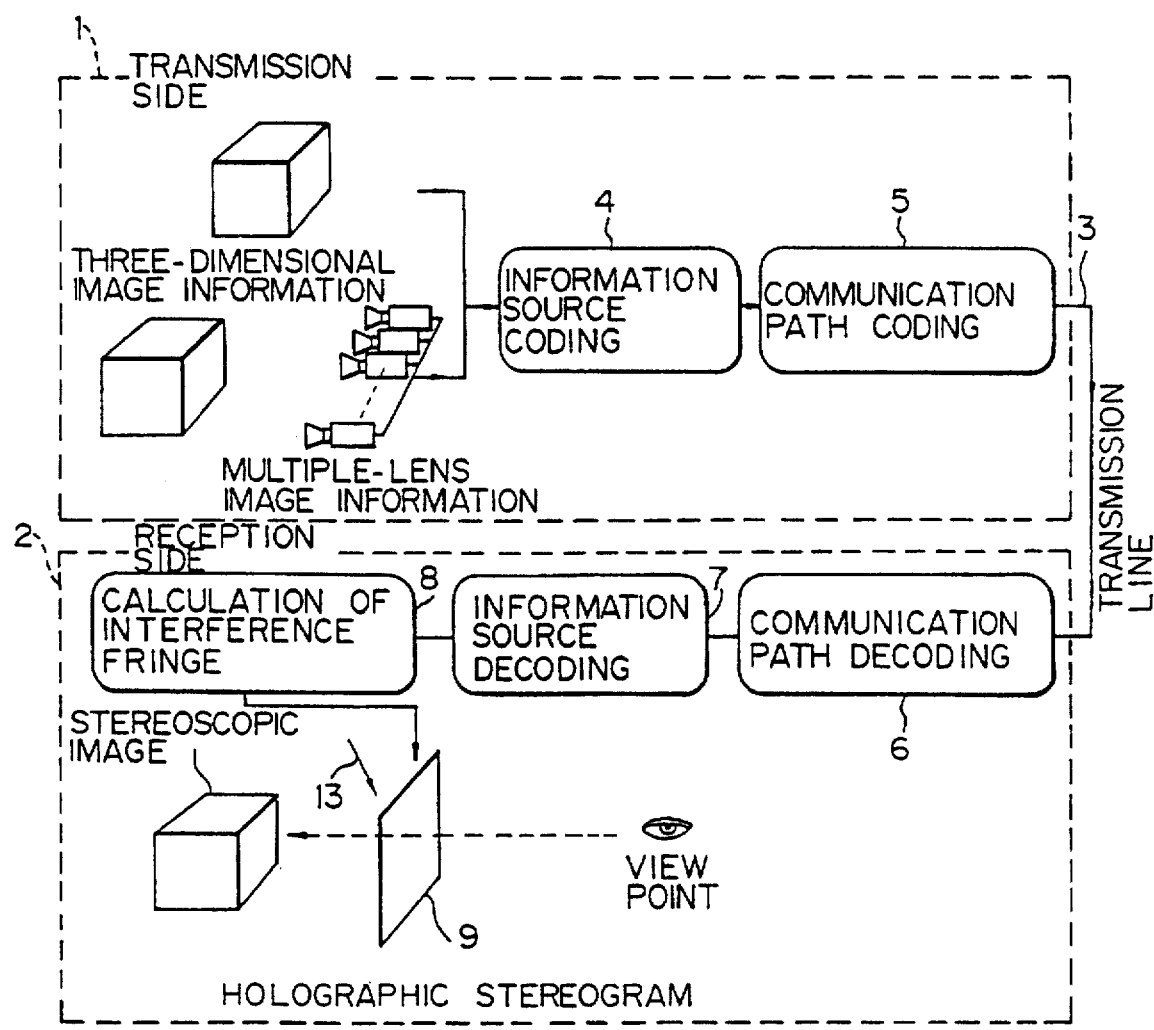
FIG. 1 is a view showing a first example of a conventional stereoscopic image information transmission system.

FIG. 1 is a view showing a first example of a conventional stereoscopic image information transmission system. The system of the figure, as illustrated, includes an information source coding means 4 for coding at the transmission side 1 the three-dimensional image information or multiple-lens image information to be transmitted; a communication path coding means 5 for applying band compression, such as run length variable length coding, to the information output from the information source coding means 4 so as to reduce the amount of information on the transmission line; a communication path decoding means 6 for receiving through the transmission line 3 the band compressed output information and restoring it to the original band; n information source decoding means 7 for reproducing from the information output from the communication path decoding means 6 the stereoscopic image information to be reproduced by one-dimensional or two-dimensional holographic stereogram 9 on the reception side 2; and an interference fringe generating means 8 for generating the interference fringe information corresponding to the said three-dimensional or multiple-lens image information forming the stereoscopic image information on the reception side 2. The interference fringe generating means 8 obtains the modulation values (interference fringes) to be loaded in the element holograms constituting the holographic stereogram 9 by performing predetermined calculations on the three-dimensional or multiple-lens image information received from the transmission side.

Figure 2:
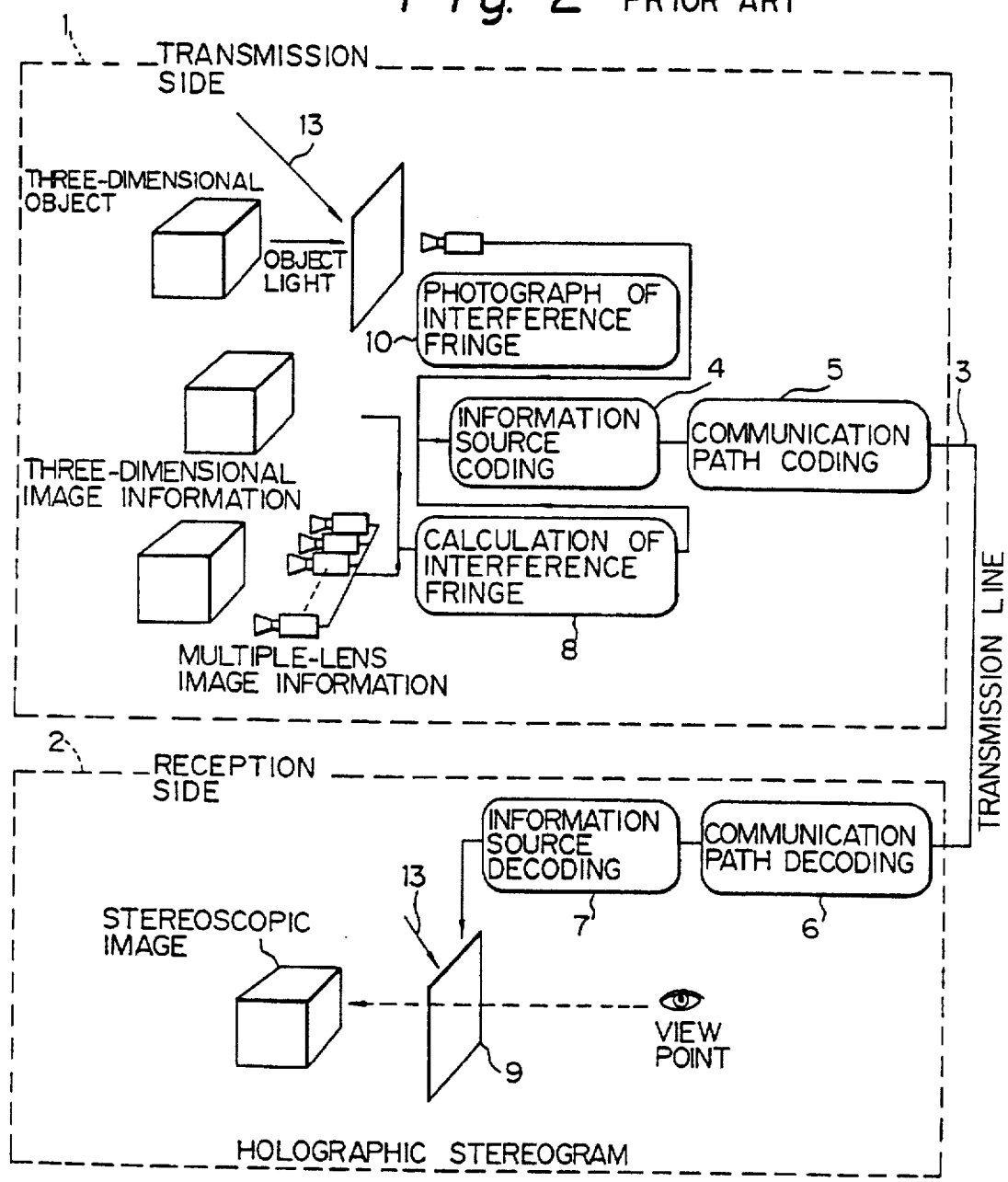
FIG. 2 is a view showing a second example of a conventional stereoscopic image information transmission system.

FIG. 2 is a view showing a second example of a conventional stereoscopic image information transmission system. Note that throughout all the figures, similar constituent elements are shown by the same reference numerals or symbols. In the illustrated system, as shown, the interference fringe generating means is eliminated from the reception side 2 and is provided at the transmission side 1. In this case, it is possible to introduce as the interference fringe generating means a means 8 obtained by calculation and an interference fringe generating (optical) means 10 using optical photographs of interference fringes. Reference numeral 13 is coherent light (reference light) causing interference with the object light. In all these cases, modulation values (interference fringes) to be loaded to the hologram are given to the information source coding means 4. Note that the information source coding means 4 has the role of transforming the image information input to digital signals suitable for transmission. For example, a DPCM etc. is widely used for transmission systems.

First, a look at the system of the first example (FIG. 1) shows that, as mentioned earlier, there is a problem with the interference fringe generating (calculating) means 8 provided at the reception side 2. The calculation of the interference fringes for generating the stereoscopic image information requires a huge amount of operations and therefore a special computer is needed. For example, when considering a broadcast service network, it would be necessary to install a special computer in each household at the reception side 2. Cost-wise, this is almost completely impractical.

This being the case, as mentioned earlier, it becomes necessary to install the interference fringe generating means at the transmission side 1 (broadcasting station in the case of the above-mentioned broadcast service network). This is the case of the system of the second example (FIG. 2). There, the interference fringe generating means (8, 10) is provided at the transmission side 1.

If the interference fringe generating means (8, 10) is provided at the transmission side, the first and second problems mentioned above arise, however.

The first problem is that the hardware on the transmission side becomes huge in size. The reason is that there is generally little correlation in the information of the interference fringes and therefore compression of the amount of information becomes difficult, so the information source coding means 4 and the communication path coding means 5 become complicated and large in size.

The second problem is that the load on the transmission lines 3 becomes extremely heavy. In view of the multiplex use of transmission lines, the rate of utilization becomes extremely poor.

Therefore, the present invention provides a stereoscopic image information transmission system which enables the hardware on the transmission side to be made much smaller and which enables the load on the transmission line to be lightened.

Figure 3:
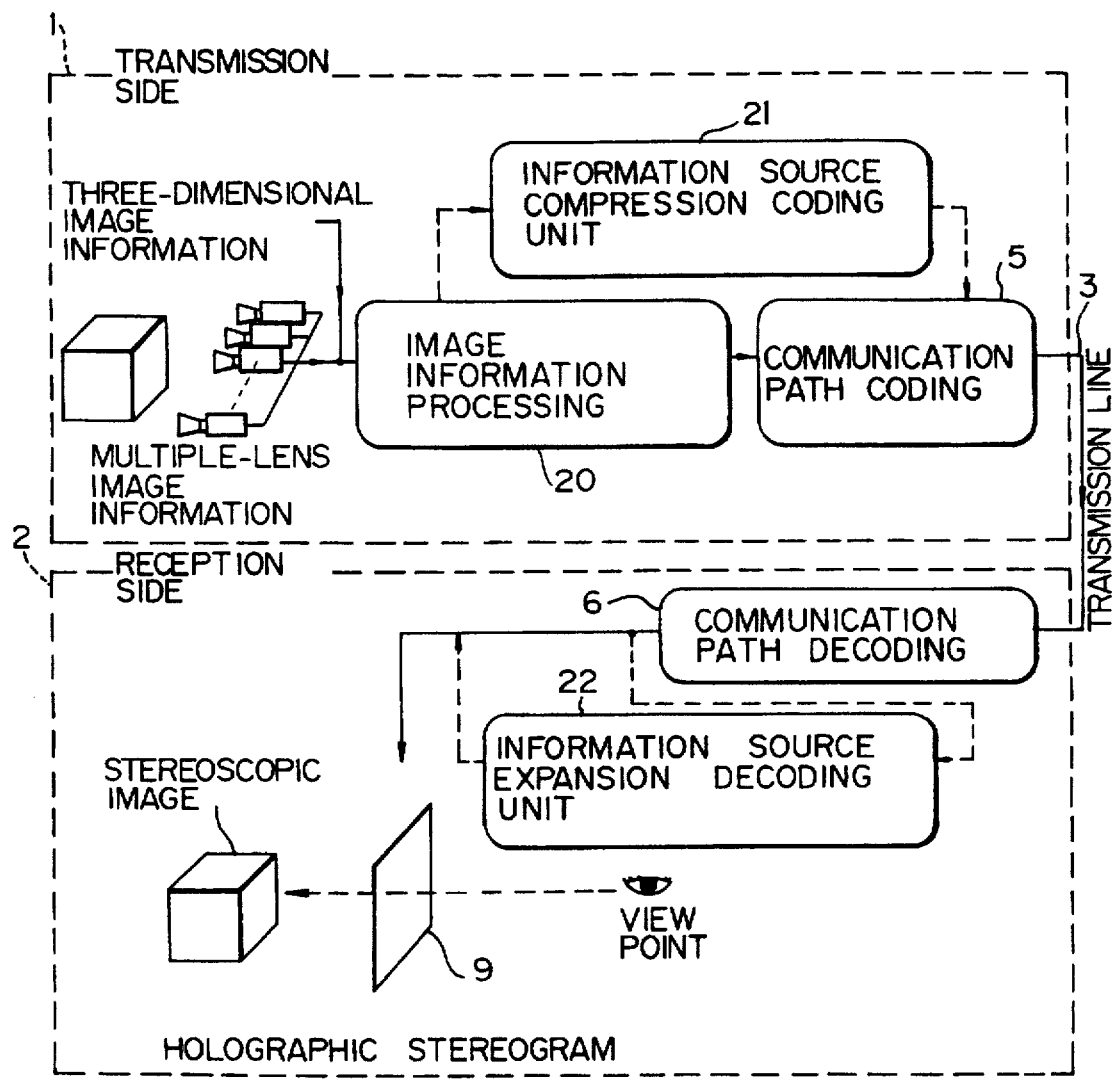
FIG. 3 is a view showing the basic structure of the present invention.

FIG. 3 is a view showing the basic structure of the present invention. In the figure, first, the transmission side 1 is constituted by a single image information processing means 20 combining the above-mentioned information source coding means 4 and the above-mentioned interference fringe generating means (8, 10).

By this, the information source decoding means 7 at the reception side 2 is eliminated and the information output from the communication path decoding means 6 is used as the stereoscopic image information. That is, the stereoscopic image information is the stereoscopic image information to be reproduced by the one-dimensional or two-dimensional holographic stereogram 9 at the reception side 2.

More preferably, an information source compression coding unit 21 for compressing the information using the correlation in image information is provided at the input side of the communication path coding means 5. In this case, it is necessary to provide an information source expansion decoding unit 22 at the reception side. Note that when the information source compression coding unit 21 is provided, the signal line connecting the means 20 and the means 5 is disconnected. Similarly, the signal line from the means 6 leading directly to the holographic stereogram 9 is disconnected.

The present invention takes note of the attempt in the prior art to make common use of functions in the interference fringe generating means (8, 10) and the information source coding means 4 and by this attempts to combine these means (4, 8, 10) using a single piece of hardware.

Further, the image information processing means 20 on the transmission side 1 does not substantially require the existence of the conventional information source coding means 4 and according the conventional information source decoding means 7 at the reception side 2 is naturally eliminated.

This has the advantage of not only reducing the size of the hardware at the transmission side, but also reducing the size of the hardware at the reception side.

Figure 4:
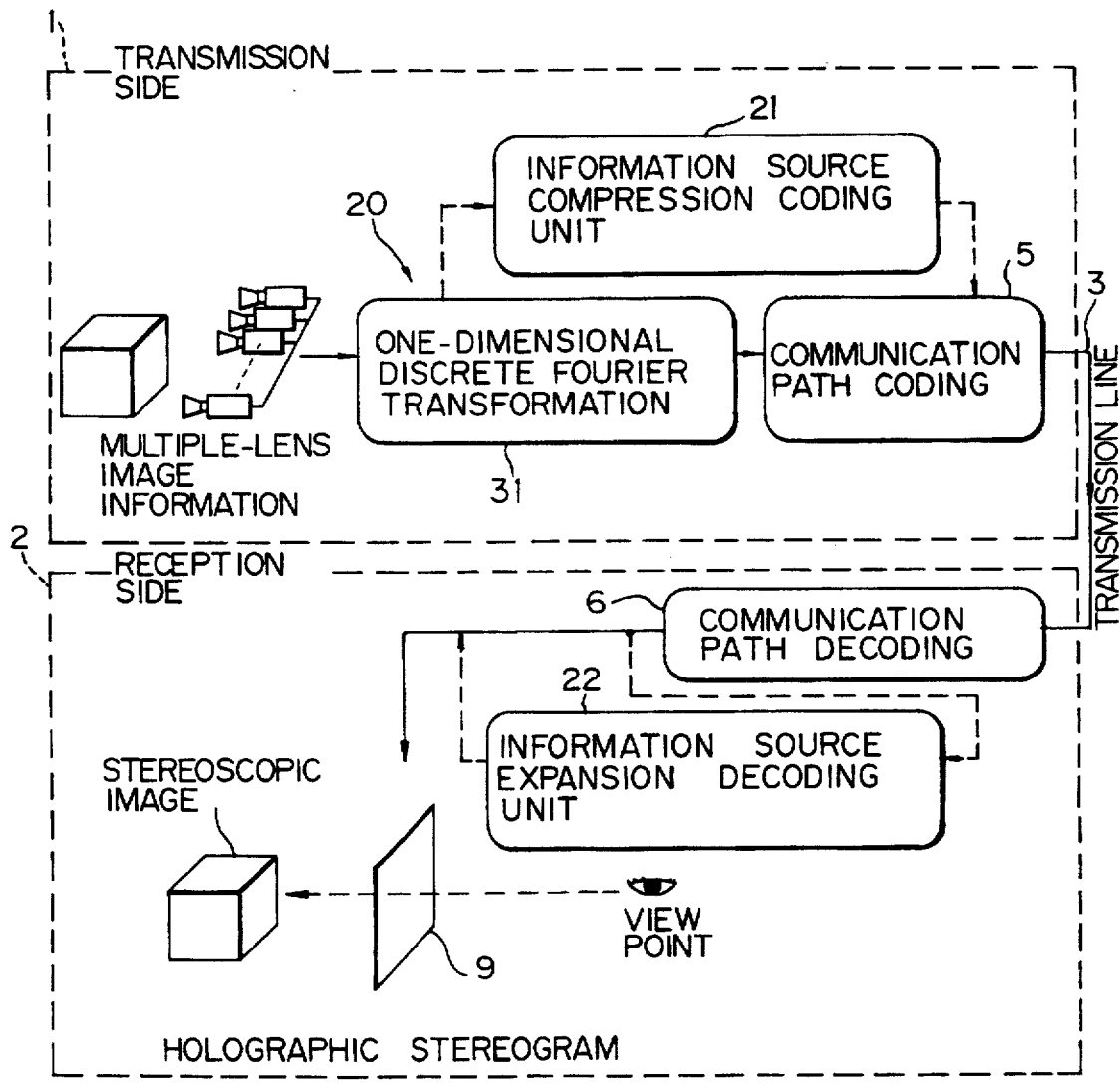
FIG. 4 is a view showing a first embodiment based on the present invention.
Figure 5:
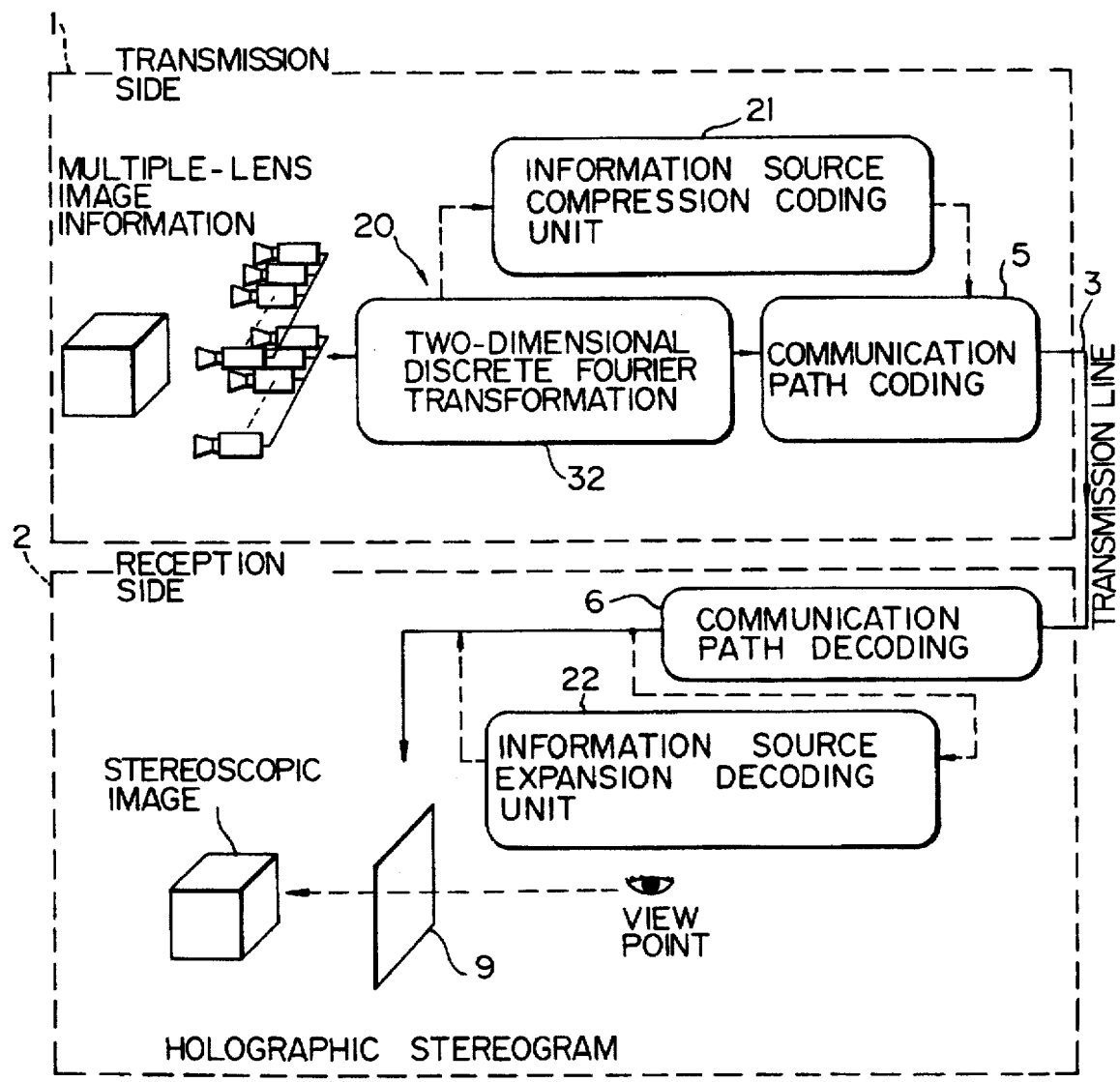
FIG. 5 is a view showing the first embodiment of FIG. 4 expanded two-dimensionally.

FIG. 4 is a view showing a first embodiment based on the present invention. Further, FIG. 5 is a view showing the first embodiment of FIG. 4 expanded two-dimensionally. The image information processing means 20 shown in FIG. 3 is constituted by a discrete Fourier transform unit (31 in FIG. 4 or 32 in FIG. 5) which performs a one-dimensional or two-dimensional discrete Fourier transform on the three-dimensional or multiple-lens image information and generates one-dimensional or two-dimensional discrete Fourier transform coefficients to be loaded to the above-mentioned one-dimensional or two-dimensional holographic stereogram 9.

The discrete Fourier transform enables the correlations in the image to be removed and the amount of the information to be compressed. Due to this, at the transmission side 1, the distribution of intensity of diffraction light to be realized at each element hologram unit is found based on a multiple-lens image found by calculation or photography. The distribution of intensity of diffraction light is subjected to one-dimensional discrete Fourier transform (FIG. 4) or two-dimensional discrete Fourier transform (FIG. 5) in each horizontal scanning direction at the transmission side. By performing this Fourier transform, the modulation values (interference fringes) of the holographic spectrogram are found. What should be noted at this time is that it is not just the modulation values (interference fringes) that are found. Information source coding (see blocks 4 in FIG. 1 and FIG. 2) is performed simultaneously. This is because, in the above way, the discrete Fourier transform has the function of removing the image correlations and compressing the amount of information.

At this time, it is preferable to apply the processing of the information source compression coding unit 21. This is because, for example, it is possible to further enhance the information compression coding by using the correlation of the stereoscopic image in the vertical direction, the correlation between the multiple-lens images of the element holograms, and, in the case of a moving picture, the correlation in the time direction.

At the reception side, the modulation values (interference fringes), that is, the information of the discrete Fourier transform coefficients, arriving through the transmission lines 3 is obtained through the communication path decoding means 6. This information is reflected in the degree of modulation of the optical modulating components using liquid crystal etc., and a one-dimensional or two-dimensional holographic stereogram is realized. The terms "optical modulation means", "optical holograms", and "optical modulation components" are used interchangeably herein, and the meanings thereof are identical to each other.

Note that it is well known in the art that when trying to reproduce a stereoscopic image using a one-dimensional or two-dimensional holographic stereogram, the degrees of modulation of the element holograms can be found by calculation by a Fourier transform of the distribution of intensity of diffraction light to be reproduced, that is, the image of the object seen from an element hologram when deeming that as a point.

In summary, by performing a discrete Fourier transform at the transmission side 1, there is no longer a need to calculate the modulation values (interference fringes) to be loaded to the element holograms of the holographic stereogram 9 at the reception side. This means a reduction in the size of the hardware in the system as a whole—not only at the transmission side, but at the reception side as well.

Further, a discrete Fourier transform means a high efficiency of coding of the signal sources with high correlations, such as images, and therefore enables a reduction of the load on the transmission line 3.

Figure 6A:
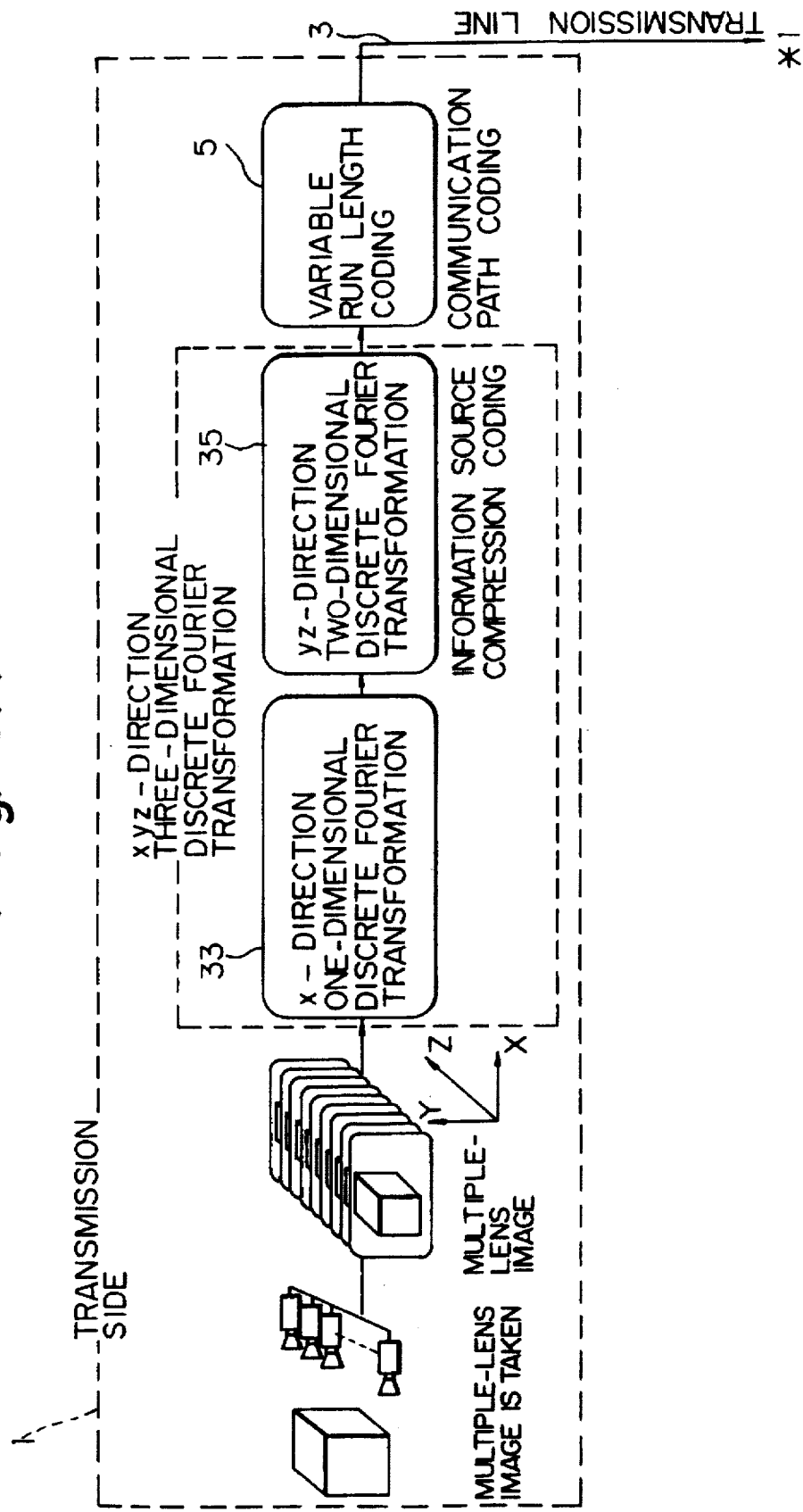
FIGS. 6A and 6B are views showing a more specific example of the structure of FIG. 4, FIGS. 7A and 7B are views showing a more specific example of the structure of FIG. 5.
Figure 6B:
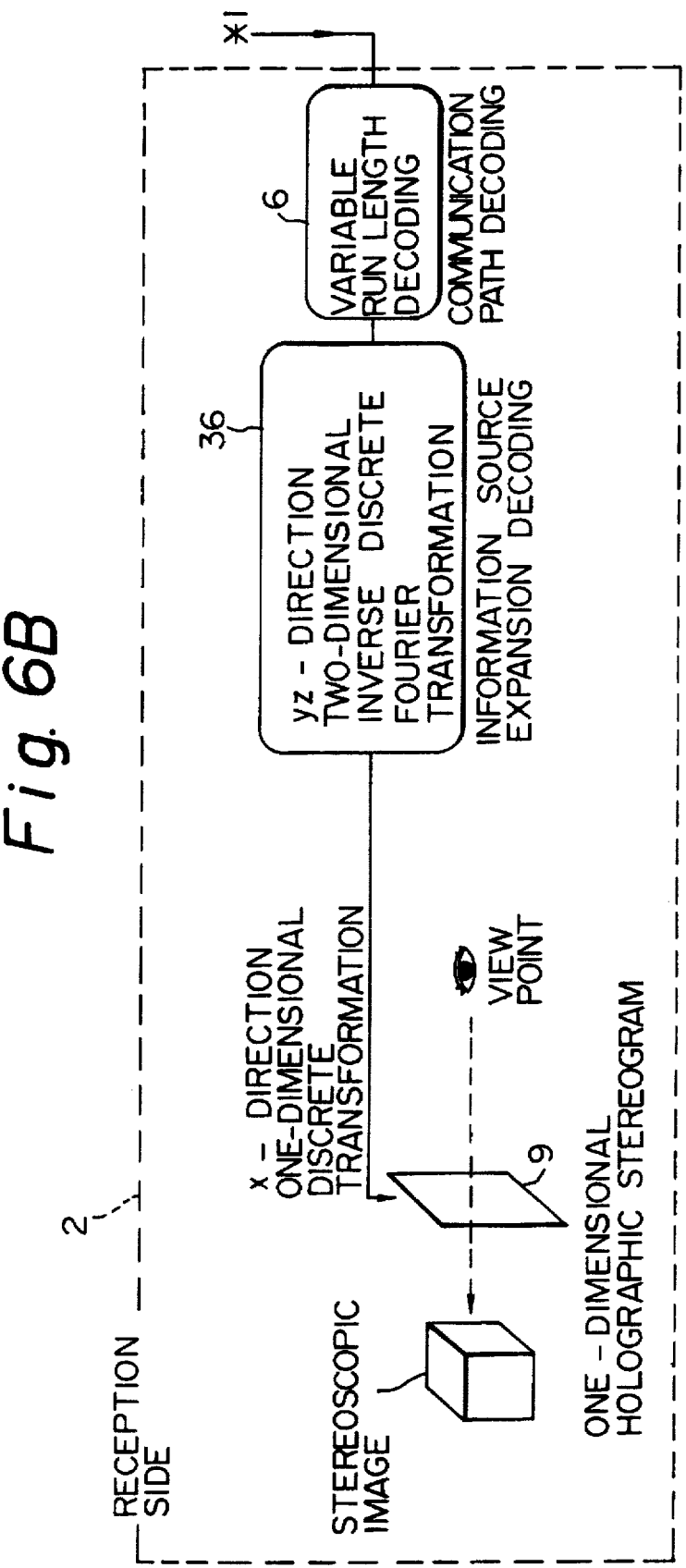
Figure 7B:
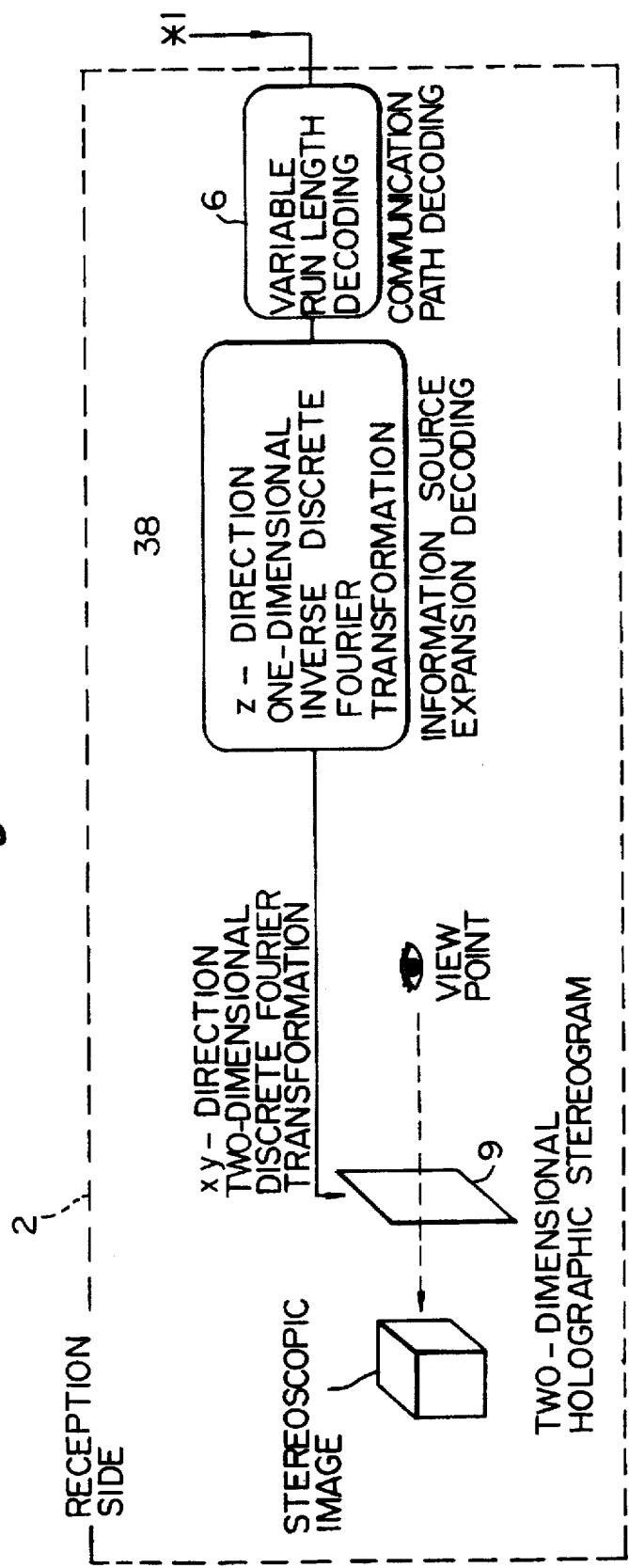

FIGS. 6A and 6B are views showing a more specific example of the structure of FIG. 4, while FIGS. 7A and 7B are views showing a more specific example of the structure of FIG. 5. Referring to FIGS. 6A and 6B and FIGS. 7A and 7B, at the transmission side, first a multiple lens image of an object to be transmitted is taken by a camera. The pixel data of the multiple lens image is virtually disposed in a three-dimensional space considering the sheet thickness direction as the Z-direction. For realization of simultaneous calculation of the coefficients of the holographic stereogram 9 and information source coding, this data is subjected to a one-dimensional discrete Fourier transform in the X-direction by the transform unit 33 in FIGS. 6A and 6B. Further, in FIGS. 7A and 7B, a two-dimensional discrete Fourier transform is performed in the X-direction and Y-5 direction by the transform unit 34. Further, for information source coding, in FIGS. 6A and 6B, a discrete Fourier transform is performed in the Y-direction and Z-direction by the coding unit 35. Further, in FIGS. 7A and 7B, a discrete Fourier transform is applied in the Z-direction. As a result, the image data is subjected to a three-dimensional discrete Fourier transform. The results are subjected to communication path coding using run length variable length coding by the coding means 5 (FIGS. 6A and 6B and FIGS. 7A and 7B) and are further sent over the transmission line 3. At the reception side, the information which is sent in is subjected to run length variable length decoding by the decoding means 6 (FIGS. 6A and 6B and FIGS. 7A and 7B). The results, opposite to the transmission side, are subjected, in FIGS. 6A and 6B, to YZ-direction inverted discrete Fourier transforms by the decoding unit 36 and, in FIGS. 7A and 7B, Z-direction inverted discrete Fourier transforms by the decoding unit 38. The processed results are the coefficients after one-dimensional discrete Fourier transforms of the lines in the X-directions of the original multiple lens image in FIGS. 6A and 6B and the coefficients after two-dimensional discrete Fourier transforms of the lines in the X- and Y-directions of the original multiple lens image.

These coefficients (modulation values) are loaded to the display device forming the holographic stereogram 9, whereby it becomes possible to obtain at the reception side a three-dimensional image of the object taken at the transmission side and a one-dimensional (FIGS. 6A and 6B) or two-dimensional (FIGS. 7A and 7B) holographic stereogram transmission system can be realized.

Therefore, there is provided a stereoscopic image information transmission system using a one-dimensional or two-dimensional holographic stereogram wherein application of a discrete Fourier transform at the transmission side enables the information source coding and the calculation of the * degree of modulation (interference fringes) to be loaded to the optical modulation components to be performed simultaneously and wherein coding and transmission based on the results enables a reduction of the hardware of the system as a whole and efficient transmission of three-dimensional image information.

Next, a second embodiment based on the present invention will be explained. The image information processing means 20 (FIG. 3) in the second embodiment is constituted by a discrete cosine transform unit which performs a one-dimensional or two-dimensional discrete cosine transform on the three-dimensional or multiple lens image information and generates one-dimensional or two-dimensional discrete cosine transform coefficients to be loaded to the one-dimensional or two-dimensional holographic stereogram.

Figure 8:
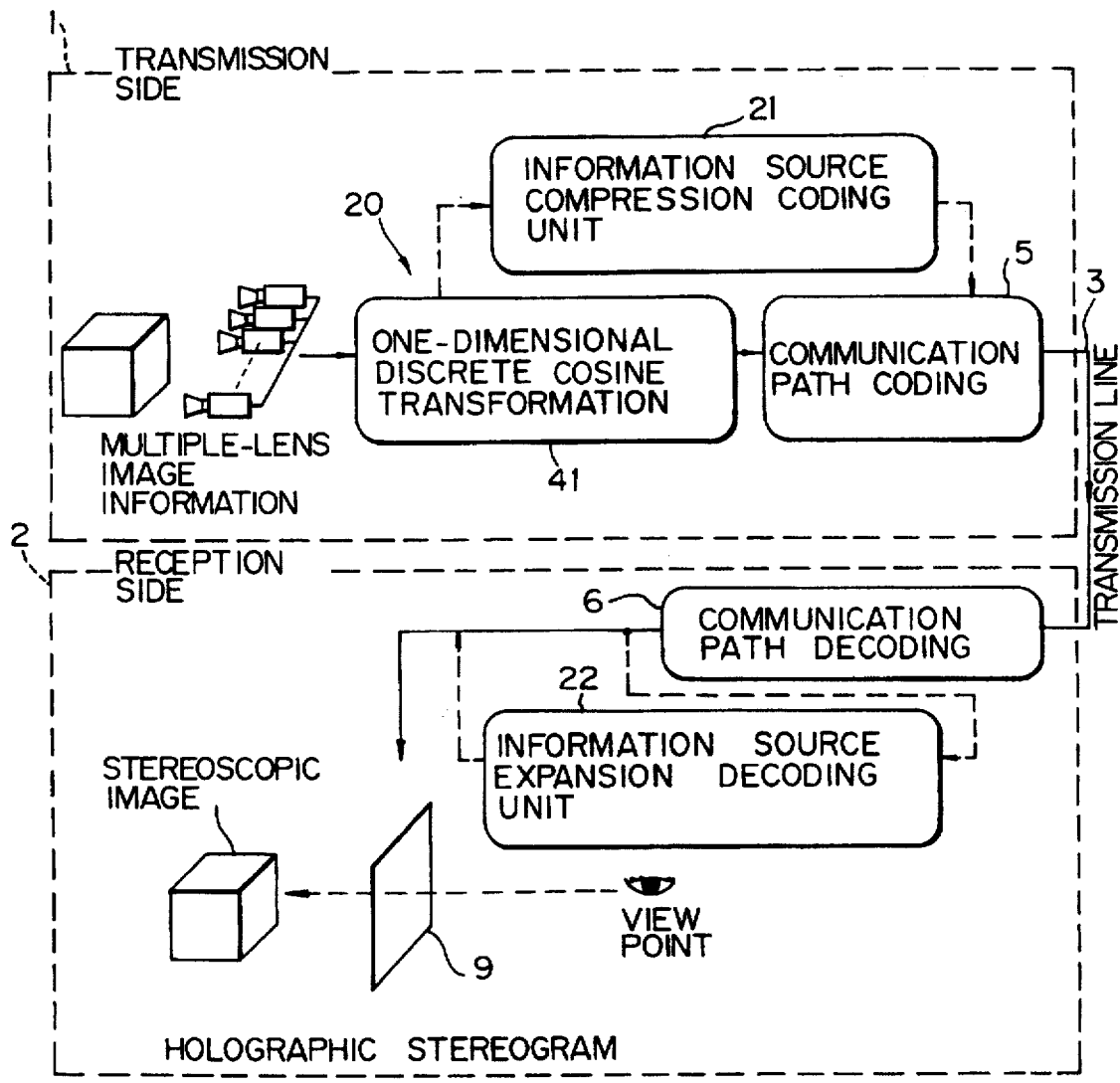
FIG. 8 is a view showing a second embodiment based on the present invention.
Figure 9:
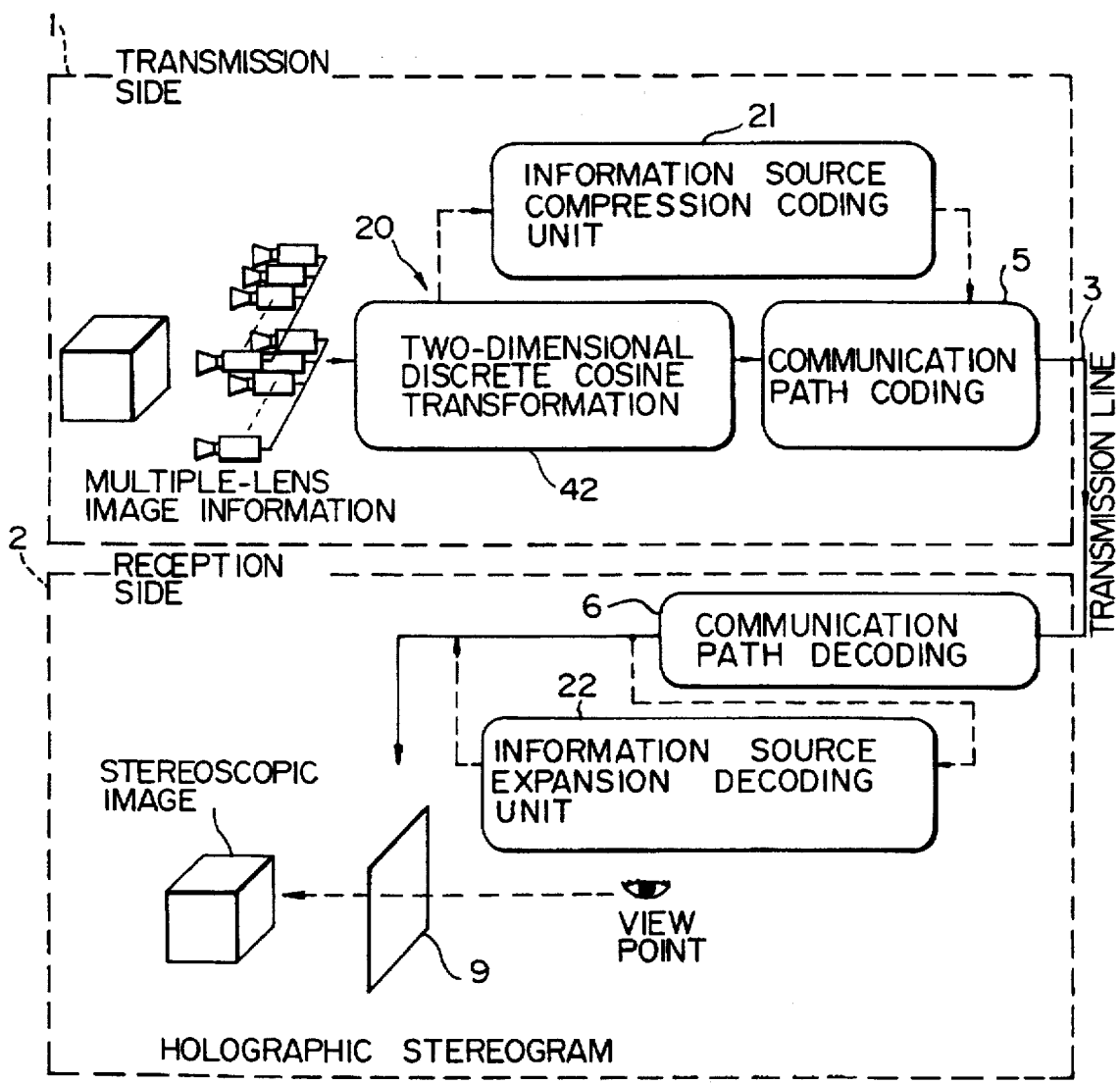
FIG. 9 is a view showing the second embodiment of FIG. 8 expanded two-dimensionally.

FIG. 8 is view showing the second embodiment based on the present invention, while FIG. 9 is a view showing the second embodiment of FIG. 8 expanded two-dimensionally. The discrete cosine transform unit, the characteristic feature of the second embodiment, is shown by reference numeral 41 in FIG. 8 and is shown by 42 in FIG. 9. The constituent elements other than the discrete cosine transform units 41 (FIG. 8) and 42 (FIG. 9) are exactly the same as those shown in FIG. 4 and FIG. 5. Therefore, the operation and functions of the transmission side 1 and the reception side 2 are exactly the same as those explained with reference to FIG. 4 and FIG. 5. That is, FIG. 8 and FIG. 9 correspond to FIG. 4 and FIG. 5 except that the one-dimensional and two-dimensional discrete Fourier transform units 21 and 22 are replaced with the one-dimensional and two-dimensional discrete cosine transform units 41 and 42.

The one-dimensional and two-dimensional discrete cosine transform units 41 and 42 can remove* the image correlations and compress the information in the same way as the one-dimensional or two-dimensional discrete Fourier transform units 21 and 22 of the first embodiment, but by using discrete cosine transforms, the size of the hardware on the reception side 2 can be further reduced. Further, the efficiency of information compression becomes higher than in the case of use of Fourier transforms. This will be explained later in further detail.

Figure 10A:
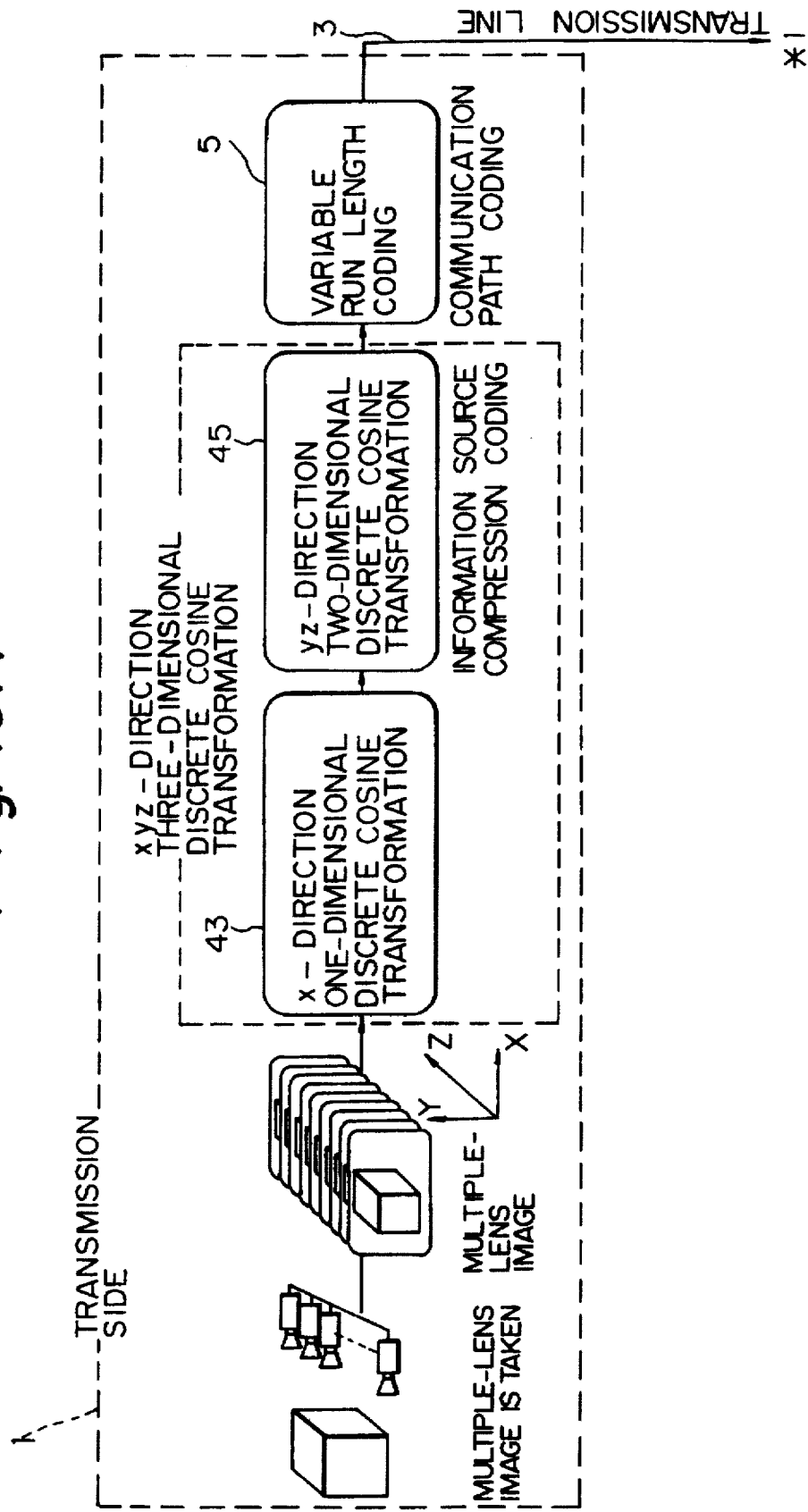
Figure 11B:
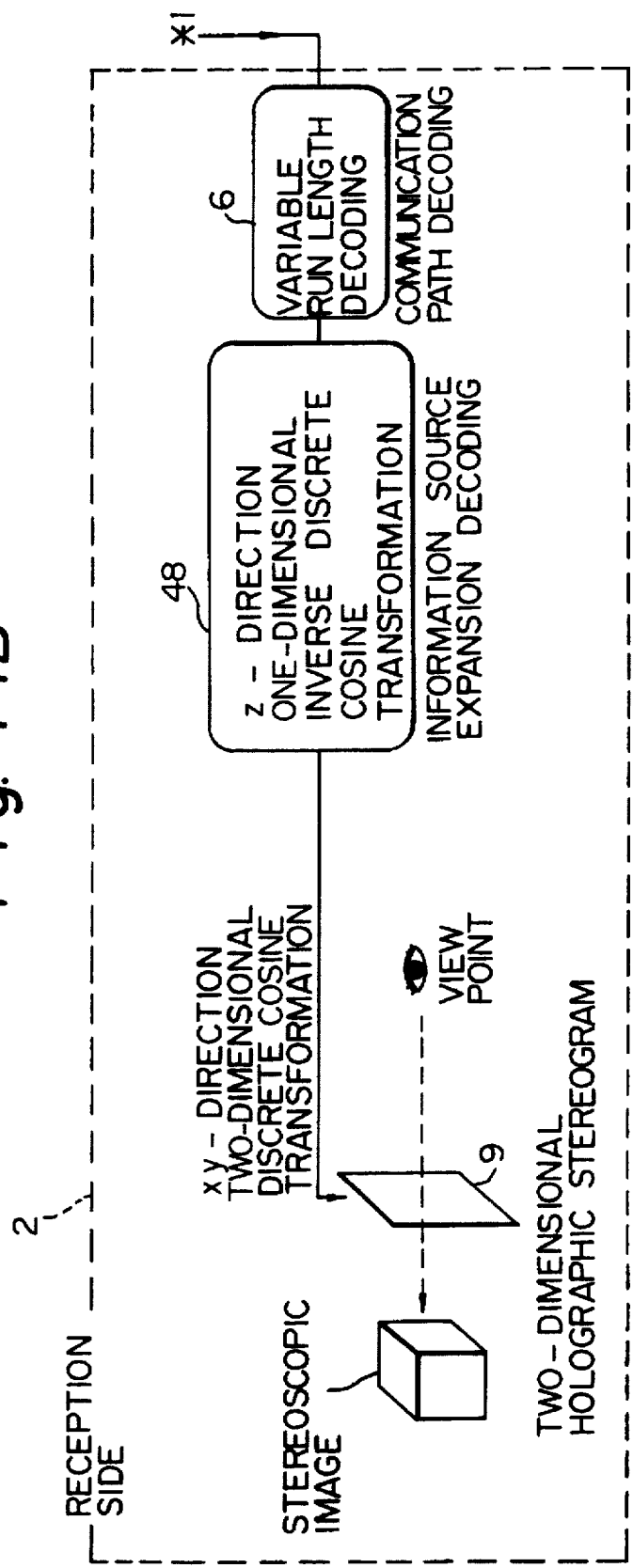

FIGS. 10A and 10B are views showing a more specific example of the structure of FIG. 8, while FIGS. 11A and 11B are views showing a more specific example of the structure of FIG. 9. The cosine transform units 43, 44, 45, 46, 47, and 48 in FIGS. 10A and 10B and FIGS. 11A and 11B correspond to the Fourier transform units 33, 34, 35, 36, 37, and 38 in FIGS. 6A and 6B and FIGS. 7A and 7B. Therefore, the above-mentioned explanation provided with reference to FIGS. 6A and 6B and FIGS. 7A and 7B applies to FIGS. 10A and 10B and FIGS. 11A and 11B as is.

Therefore, in a stereoscopic image information transmission system using a one-dimensional or two-dimensional holographic stereogram, by applying a discrete cosine transform at the transmission side, it is possible to simultaneously perform the information source coding and the calculation of the degree of modulation (interference fringes) to be loaded to the optical modulation components* and to transmit the coded information based on the results, thereby reducing the hardware of the system as a whole and efficiently transmitting three-dimensional image information.

Next, a third embodiment based on the present invention will be explained. The image information processing means 20 (FIG. 3) in the third embodiment is constituted by a discrete sine transform unit which performs a one-dimensional or two-dimensional discrete sine transform on the three-dimensional or multiple lens image information and generates one-dimensional or two-dimensional discrete sine transform coefficients to be loaded to the one-dimensional or two-dimensional holographic stereogram.

Figure 12:
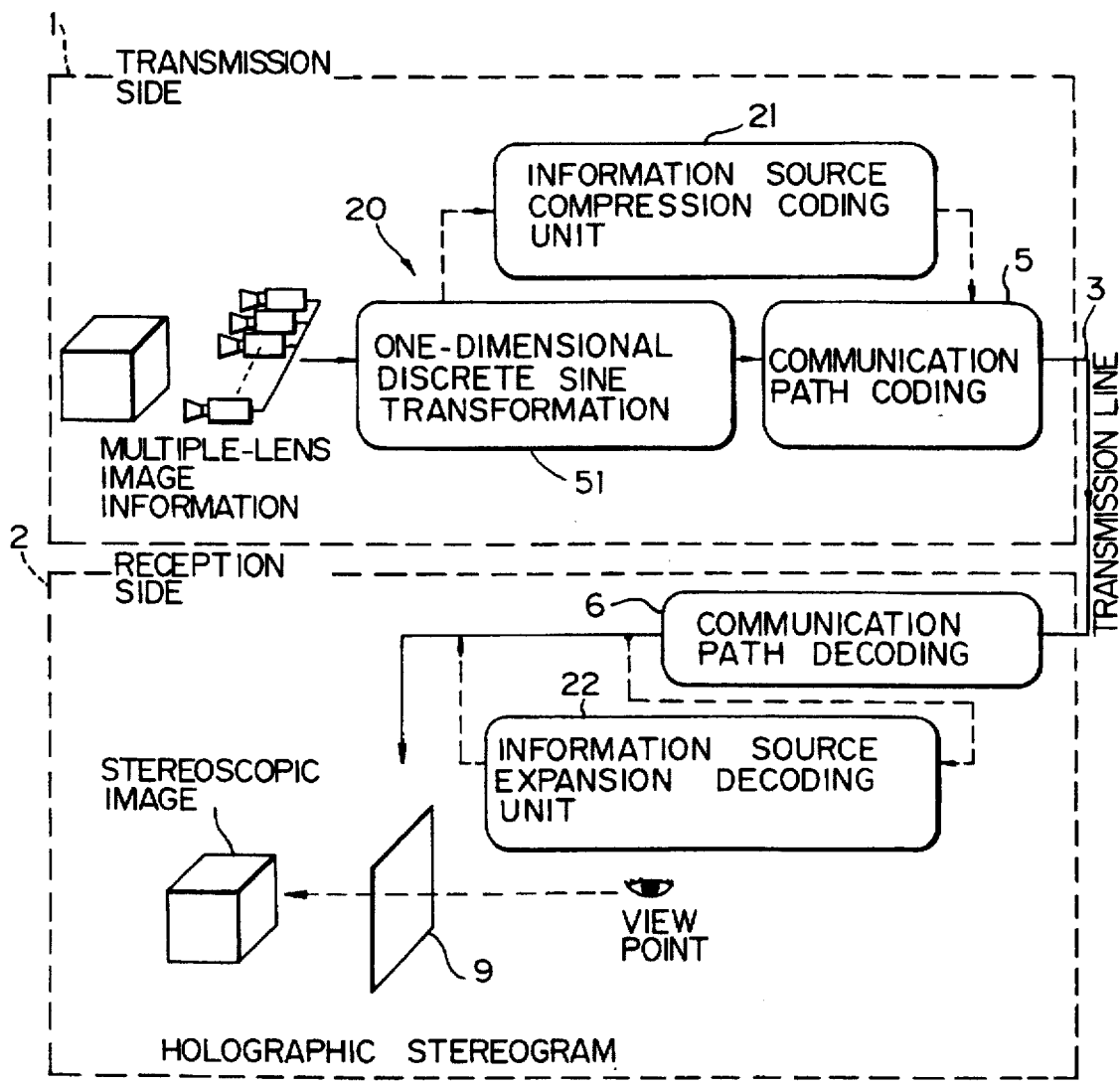
FIG. 12 is view showing a third embodiment based on the present invention.
Figure 13:
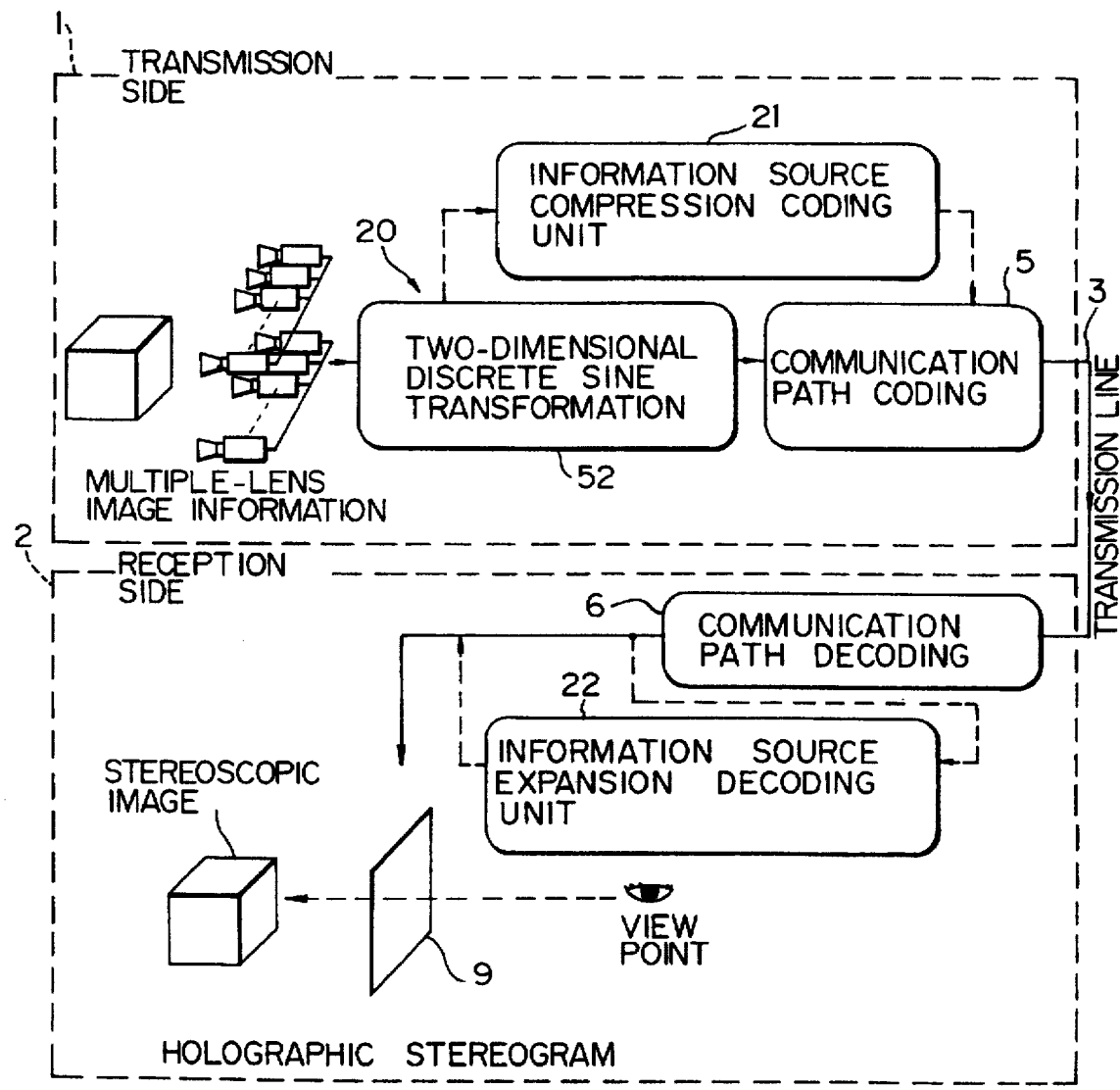
FIG. 13 is a view showing the third embodiment of FIG. 12 expanded two-dimensionally.

FIG. 12 is view showing a third embodiment based on the present invention, while FIG. 13 is a view showing the third embodiment of FIG. 12 expanded two-dimensionally. The discrete sine transform unit, the characteristic feature of the third embodiment, is shown by reference numeral 51 in FIG. 12 and is shown by 52 in FIG. 13. The constituent elements other than the discrete sine transform units 51 (FIG. 12) and 52 (FIG. 13) are exactly the same as those shown in FIG. 4 and FIG. 5. Therefore, the operation and functions of the transmission side 1 and the reception side 2 are exactly the same as those explained with reference to FIG. 4 and FIG. 5. That is, FIG. 12 and FIG. 13 correspond to FIG. 4 and FIG. 5 except that the one-dimensional and two-dimensional discrete Fourier transform units 21 and 22 are replaced with the one-dimensional and two-dimensional discrete sine transform units 51 and 52.

The one-dimensional and two-dimensional discrete sine transform units 51 and 52 can remove* the image correlations and compress the information in the same way as the one-dimensional or two-dimensional discrete Fourier transform units 21 and 22 of the first embodiment, but by using discrete sine transforms, the size of the hardware on the reception side 2 can be further reduced. Further, the efficiency of information compression becomes higher than in the case of use of Fourier transforms. This will be explained later in further detail.

Figure 14A:
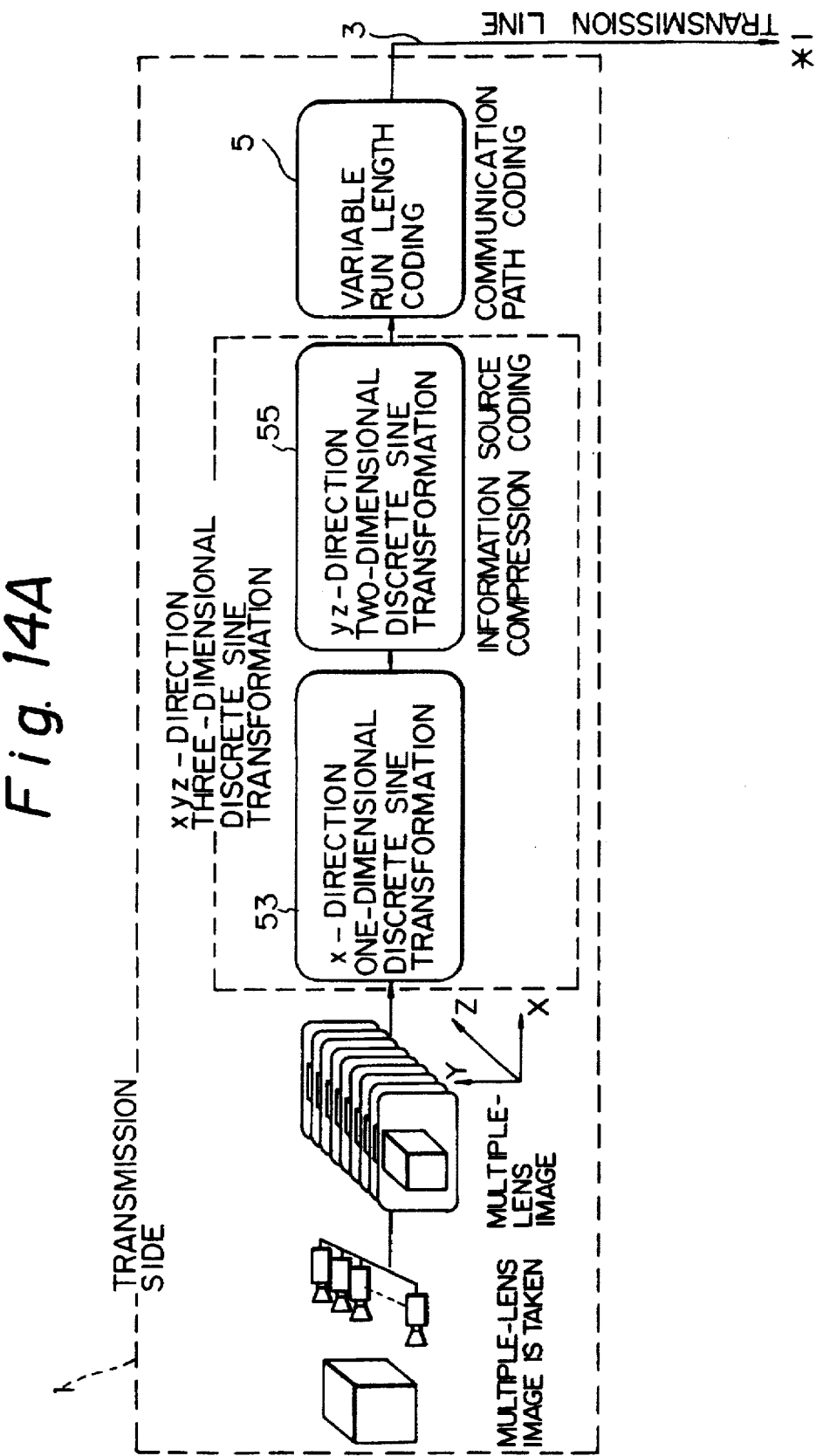
FIGS. 14A and 14B are views showing a more specific example of the structure of FIG. 12, FIGS. 15A and 15B are views showing a more specific example of the structure of FIG. 13.
Figure 14B:
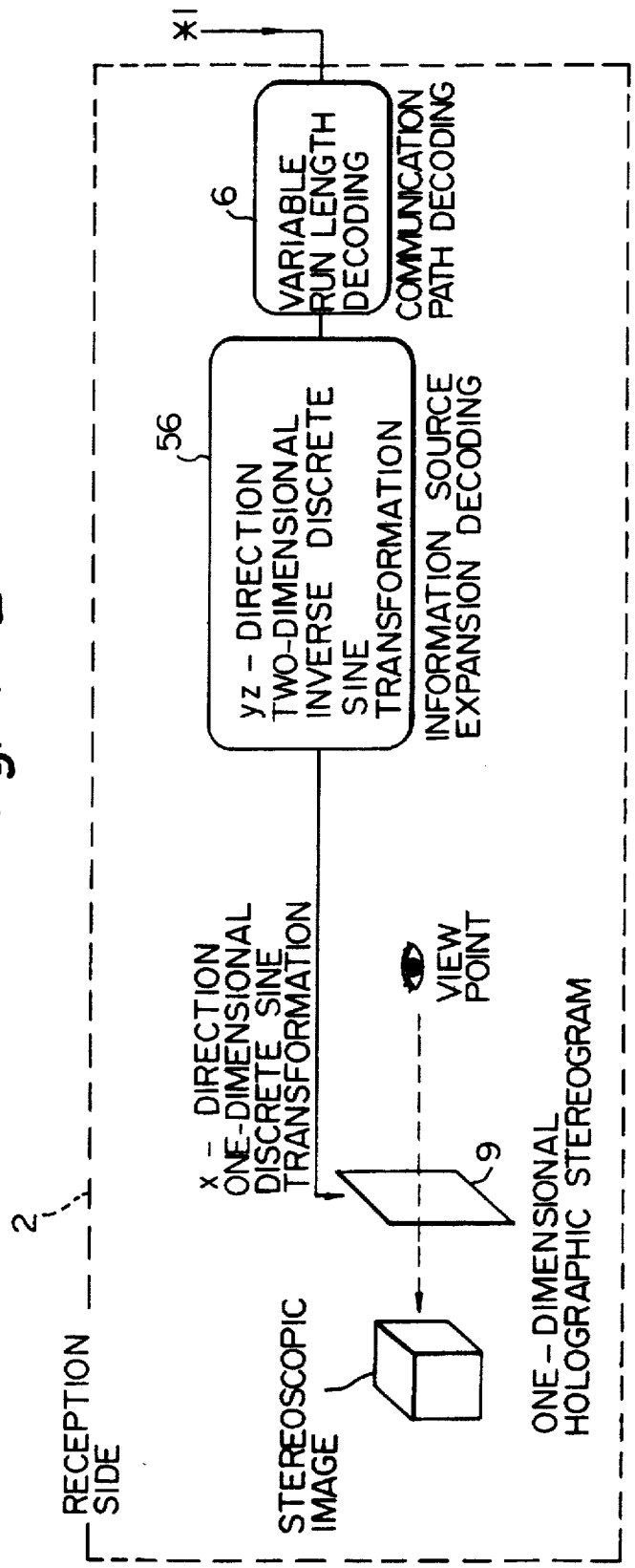
Figure 15A:
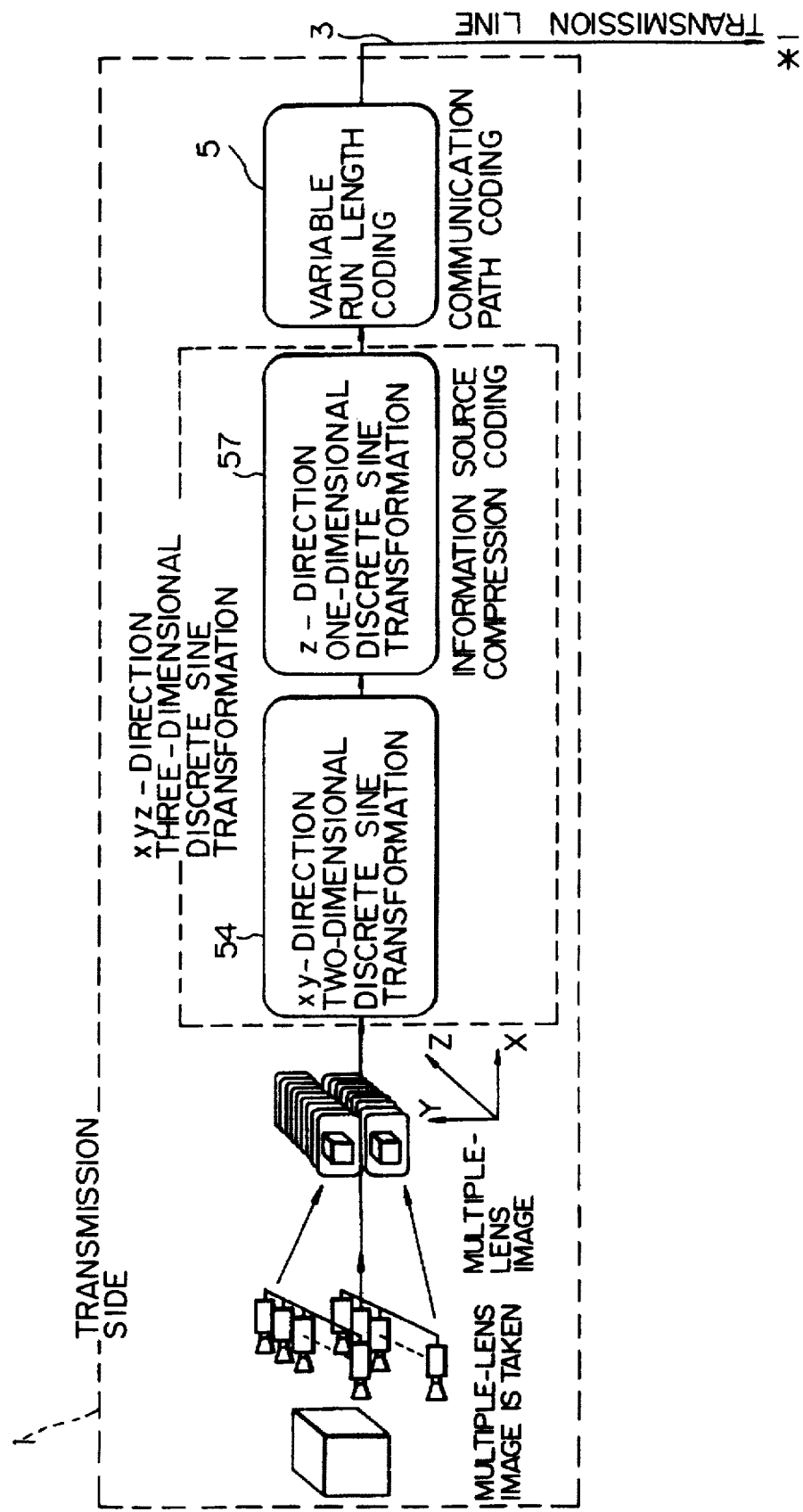
Figure 15B:
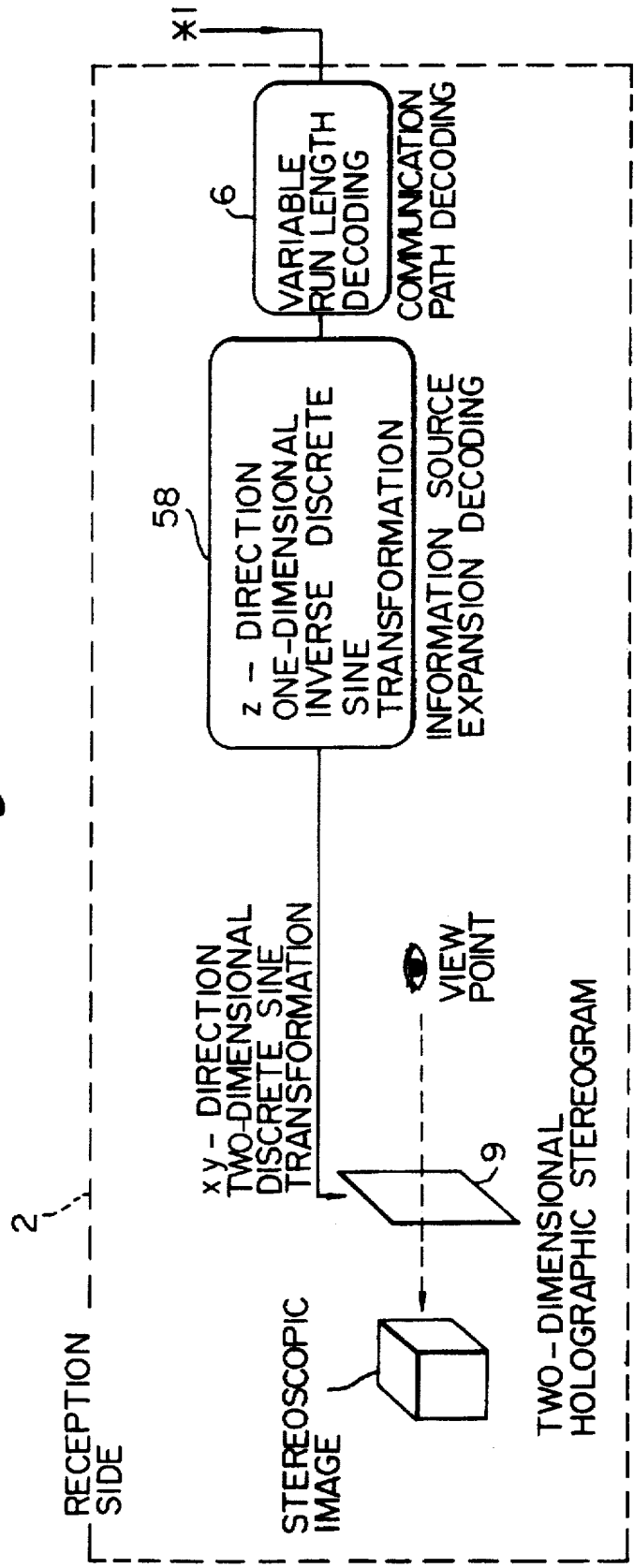

FIGS. 14A and 14B are views showing a more specific example of the structure of FIG. 12, while FIGS. 15A and 15B are views showing a more specific example of the structure of FIG. 13. The sine transform units 53, 54, 55, 56, 57, and 58 in FIGS. 14A and 14B and FIGS. 15A and 15B correspond to the Fourier transform units 33, 34, 35, 36, 37, and 38 in FIGS. 6A and 6B and FIGS. 7A and 7B. Therefore, the above-mentioned explanation provided with reference to FIGS. 6A and 6B and FIGS. 7A and 7B applies to FIGS. 14A and 14B and FIGS. 15A and 15B as is.

Therefore, in a stereoscopic image information transmission system using a one-dimensional or two-dimensional holographic stereogram, by applying a discrete sine transform at the transmission side, it is possible to simultaneously perform the information source coding and the calculation of the degree of modulation (interference fringes) to be loaded to the optical modulation components* and to transmit the coded information based on the results, thereby reducing the hardware of the system as a whole and efficiently transmitting three-dimensional image information.

The discrete cosine transform in the second embodiment and the discrete sine transform in the third embodiment are superior in the following three points compared with the discrete Fourier transform in the first embodiment. First, it is possible to simplify the drive system of the display device (for example, liquid crystal) forming the holographic stereogram 9 at the reception side 2. Second, the information compression efficiency is high. Third, it is possible to faithfully reproduce the distribution of intensity of diffraction light as in the original stereoscopic image. Evidence of the above will be provided below.

Figure 16:
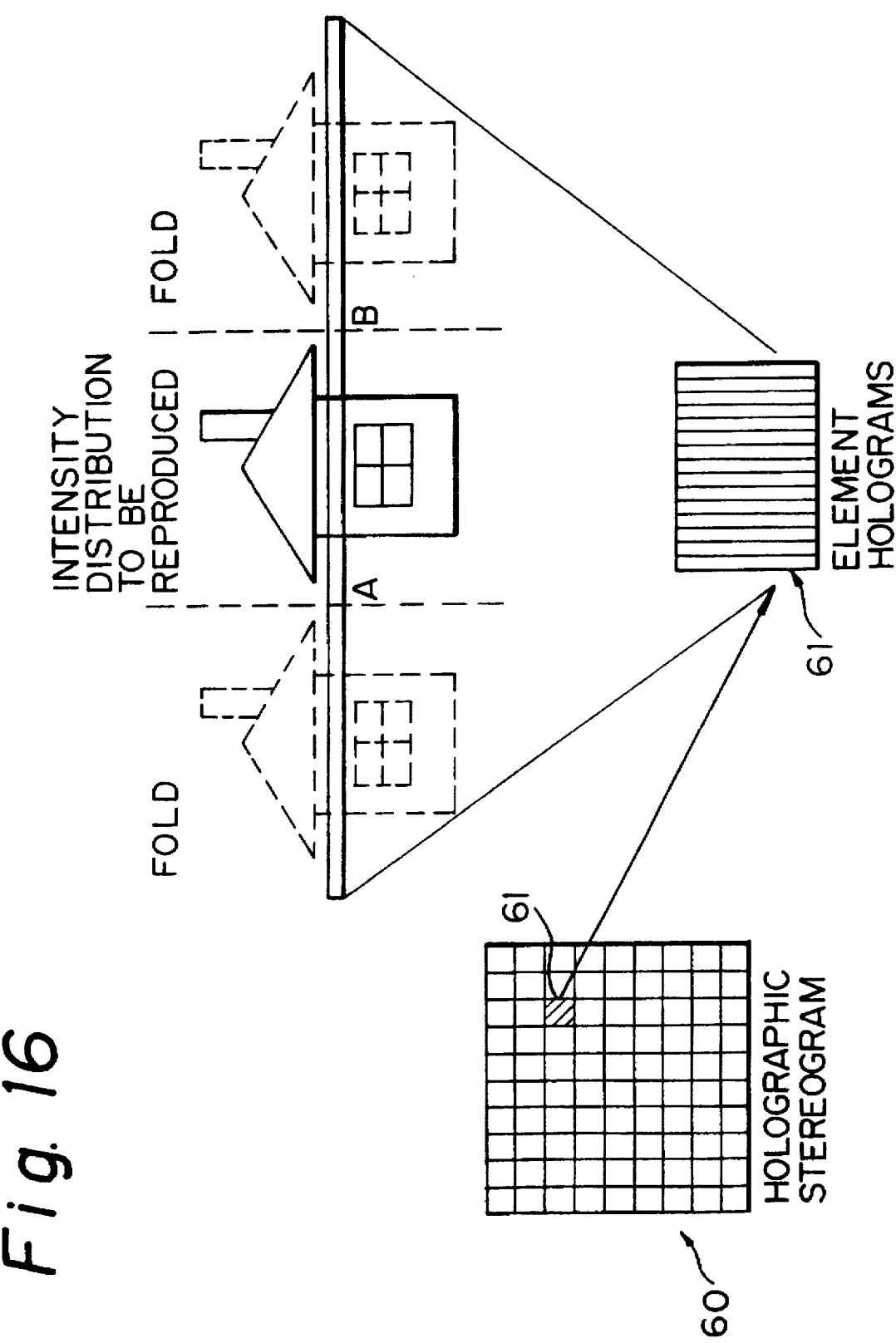
FIG. 16 is a view explaining a conventional computer-generated one-dimensional holographic stereogram.

FIG. 16 is a view explaining a conventional computer-generated one-dimensional holographic stereogram. In the figure, 60 is the holographic stereogram to be finally reproduced. It is comprised of an array of a plurality of element holograms 61. Each of the element holograms 61 is loaded with a unique modulation value corresponding to the stereoscopic image to be reproduced. Further, each of the element holograms 61 is divided into a plurality of cells.

According to the example shown in the figure, the stereoscopic image to be reproduced by the element hologram 61 is a house. The image shows the distribution of intensity of diffraction light.

The above-mentioned computer-generated one-dimensional holographic stereogram 60 is known as technique for obtaining a stereoscopic image by a simpler method than a usual hologram by omitting the three-dimensional effect in the vertical direction.

In a one-dimensional holographic stereogram, however, it is known that the pattern of an element hologram (modulation value to be loaded) is equal to the result of a Fourier transform applied to the distribution of intensity of diffraction light (image shown itself) in the horizontal direction (left-right in the figure) under the condition that the "point of sight is sufficiently far compared with the size of the element hologram".

As a conventional method for deriving the modulation values (interference fringes) to be loaded to the element holograms 61 to realize a computer generated one-dimensional holographic stereogram 60, there is known the method of using a discrete Fourier transform by making discrete the distribution of intensity of diffraction light with respect to the angle (angle from center of an element hologram to points in a block AB).

The concept of the use of the above technique is illustrated in FIG. 16. With this technique, the view scope is limited to the block AB shown, so as shown in FIG. 16, the actual distribution of intensity of diffraction light is periodic. The periodic distributions are usually called "folds" and are shown by the broken line images in the figure.

The distribution of the modulation values found by the technique (patterns of element holograms) is displayed on a display device able to spatially modulate the light intensity, such as a liquid crystal. A one-dimensional Fourier series of the distribution of intensity of diffraction light of the block AB is loaded and the element hologram sought is formed. All the other element holograms are formed in the same way to give a computer-generated one-dimensional holographic stereogram. This above also applies to a computer-generated two-dimensional holographic stereogram.

Figure 17:
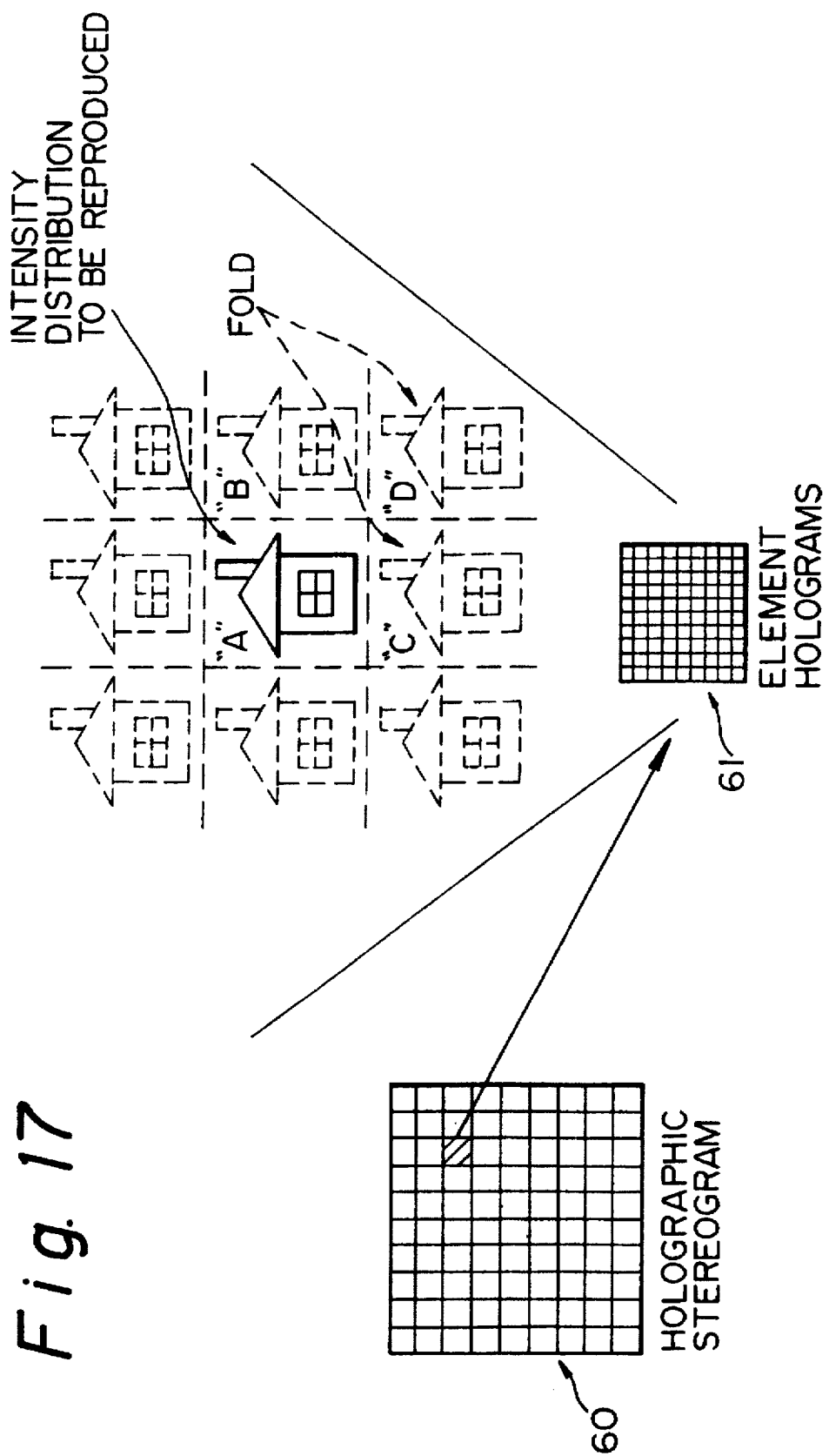
FIG. 17 is a view explaining a conventional computer-generated two-dimensional holographic stereogram.

FIG. 17 is a view explaining a conventional computer-generated two-dimensional holographic stereogram.

Even in the case of a computer-generated two-dimensional holographic stereogram, the above technique of a Fourier transform is used. The Fourier transform is performed limiting the view scope to the area "A" shown in FIG. 17. Therefore, as shown in FIG. 17, the actual distribution of intensity of diffraction light which is reproduced becomes periodic (forms folds) in the same way as FIG. 16.

Further, in the same way as the case of FIG. 16, the distribution of modulation values found by the Fourier transform technique (patterns of element holograms) is expressed on a display device able to spatially modulate the light intensity, such as a liquid crystal. The two-dimensional Fourier series of the distribution of the intensity of diffraction light desired to be reproduced at the area "A" is loaded and the element hologram sought is formed. All the other element holograms are formed in the same way to obtain a computer-generated two-dimensional holographic stereogram.

If finding the modulation values by the above-mentioned method by performing a discrete Fourier transform, in general since the Fourier transform (F(ω)) of f(x) is expressed by $$F(\omega) = \frac{1}{\sqrt{2\pi}} \int_{-\infty}^{\infty} f(x) e^{-j\omega x} dx \tag{1}$$

not only the real component, but also the imaginary component appears. The same holds true for both one-dimensional and two-dimensional holographic stereograms.

Therefore, if trying to faithfully reproduce the distribution of intensity of diffraction light, it is necessary that the display device not only be able to perform modulation of the amplitude (amplitude modulation), but also be able to perform modulation of the index of refraction (phase modulation). Accordingly, there is the first problem that the drive system of the display device becomes complicated.

Further, in general, in a Fourier transform, it is known, the converted energy exists up to the higher order terms. As a result, there is the second problem that it becomes difficult to establish the condition (assumption) of the "point of sight being sufficiently far compared with the size of the element hologram" and therefore faithful reproduction of the distribution of intensity of diffraction light is inhibited. The above-mentioned second and third embodiments can eliminate the two defects of the first embodiment.

Figure 18:
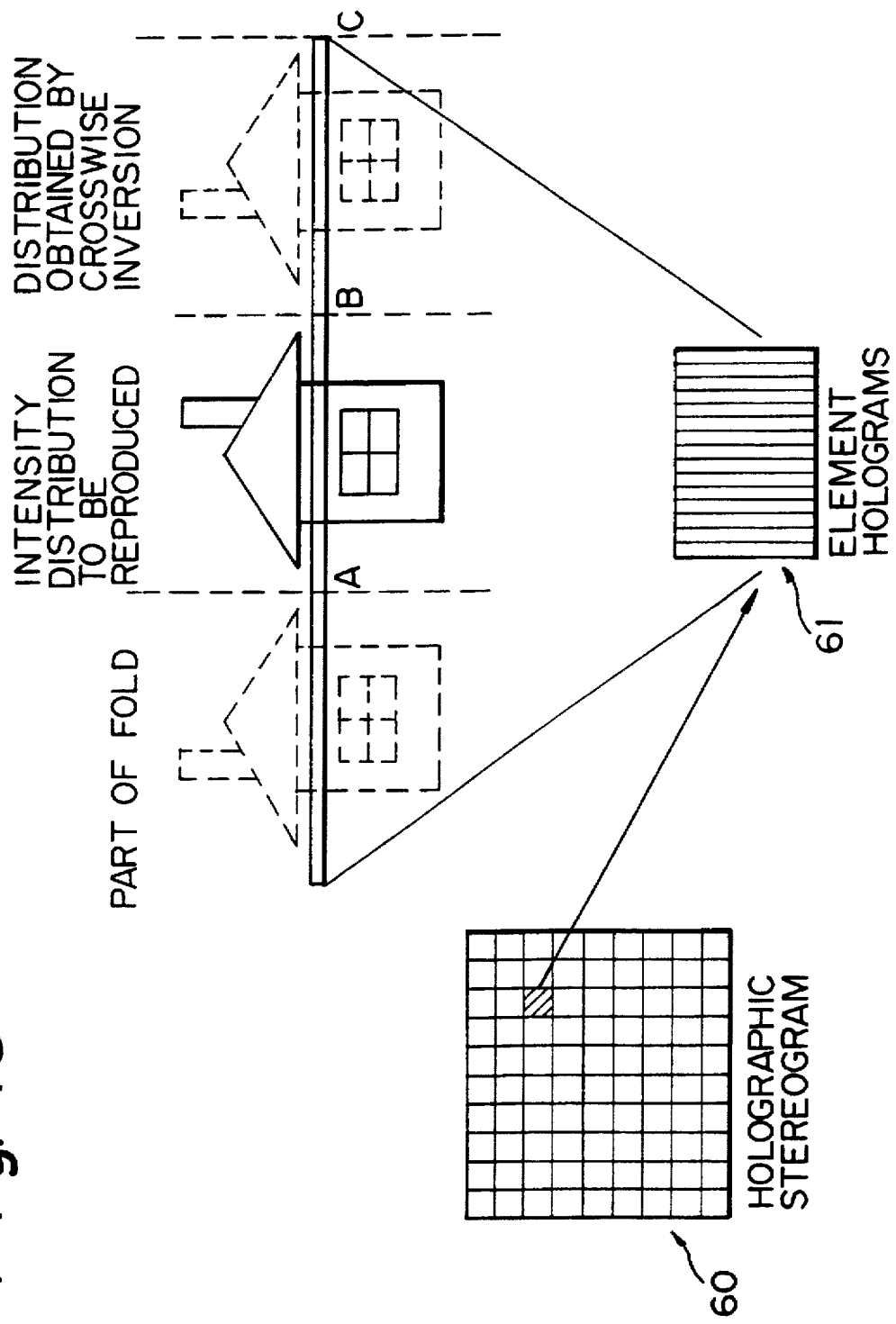
FIG. 18 is a view explaining a computer-generated one-dimensional holographic stereogram according to the second embodiment.
Figure 19:
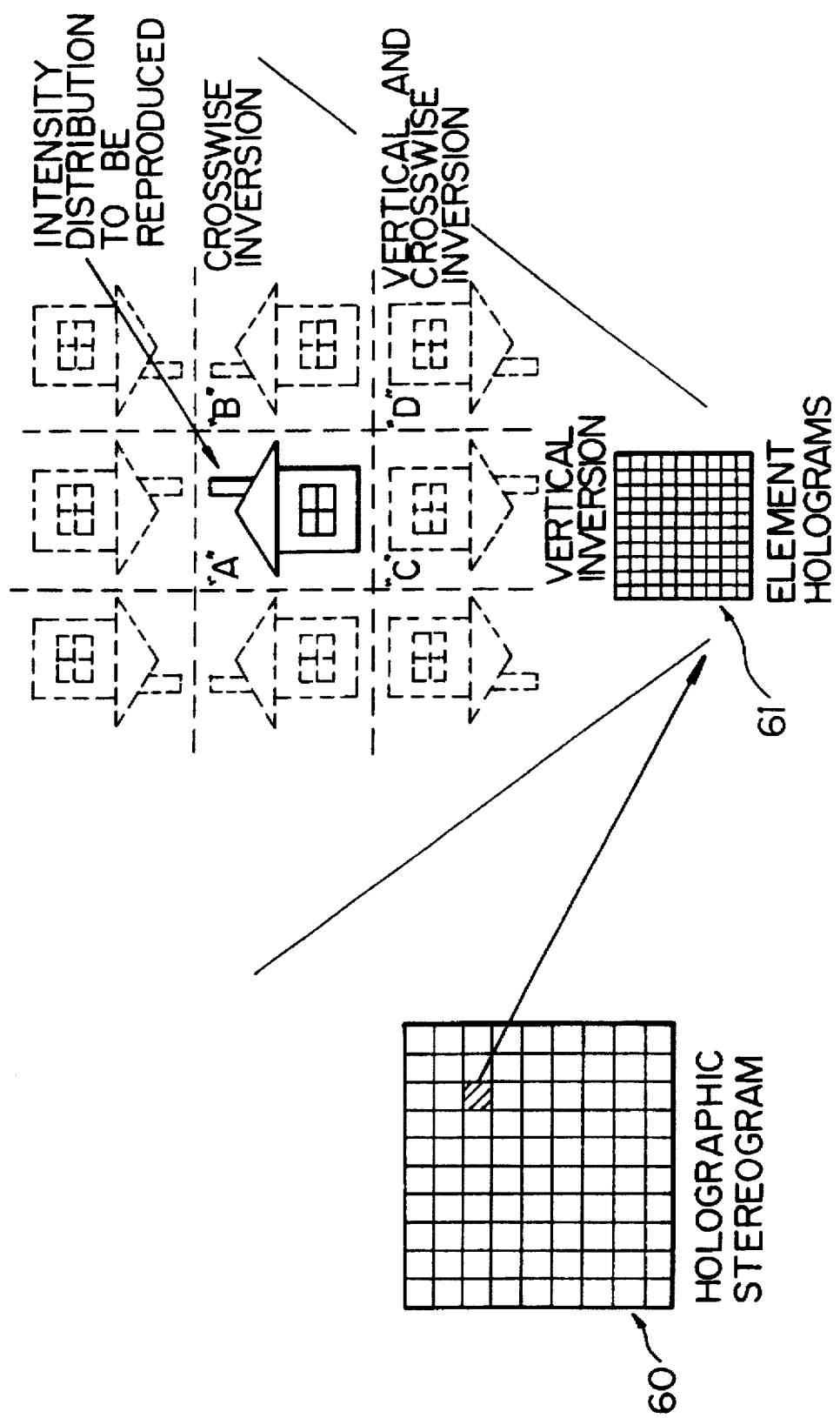
FIG. 19 is a view explaining a computer-generated two-dimensional holographic stereogram according to the second embodiment.

FIG. 18 is a view explaining a computer-generated one-dimensional holographic stereogram according to the second embodiment. Further, FIG. 19 is a view explaining a computer-generated two-dimensional holographic stereogram according to the second embodiment.

Referring first to FIG. 18, the distribution of intensity of diffraction light desired to be reproduced exists in the block AB, but the block BC having a distribution of intensity of diffraction light which is virtually crosswise inverted ("distribution obtained by both crosswise inversion" in the figure) can be considered to be simultaneously reproduced with the block AB. That is, the block AC is formed as the hologram. To reproduce such a distribution of intensity of diffraction light, the modulation values (interference fringes) to be loaded in the element holograms 61 are obtained by performing a discrete Fourier transform on the distribution of intensity of diffraction light present in the block AB.

There is no sine component, however, in the modulation value of the block AC obtained here. The reason is that, in FIG. 18, the distribution of the block AC is inverted crosswise about the point B. The distribution of the block AC becomes an even function, so the sine component in the above-mentioned $e^{jxt}$ (=cosxt+jsinxt) disappears.

In the end, the Fourier transform on the distribution of intensity in the block AC becomes equivalent to a discrete cosine transform of the distribution of intensity in the block AB. In this case, a distribution obtained by crosswise inversion is virtually introduced as the distribution of the block BC, but this block BC is outside the view scope of the block AB and therefore there is no problem with the introduction of the block BC.

In the above-mentioned discrete cosine transform, all the transform coefficients (modulation values to be loaded) are real numbers. Therefore, when realizing a display device, it is sufficient to modulate only the amplitude and the drive system of the display device is simplified. In general, when considering the vector cosθ +jsinθ, unless both the cosθ component and the sinθ component are 0, the phase component (θ) expressed by tanθ (=sinθ/cosθ) appears, so at this time it is necessary to consider not only modulation of the amplitude, but also the modulation of the phase (index of refraction). Since as mentioned above, however, the sine component is 0, it is sufficient to find the modulation value for only the amplitude.

The above-mentioned discrete cosine transform corresponds to the generally known orthogonal transform in image processing techniques and therefore it can be easily understood that the above-mentioned transform coefficients concentrate at the lower order terms. As a result, the aforementioned condition (assumption) that the "point of sight is sufficiently far compared with the size of the element hologram" can be sufficiently satisfied and faithful reproduction of the distribution of intensity of diffraction light becomes possible.

The above applies to the computer-generated two-dimensional holographic stereogram shown in FIG. 19 as well.

Referring first to FIG. 19, the distribution of the intensity of diffraction light desired to be reproduced exists in the area "A", but the areas "B", "C", and "D" having distributions of intensity of diffraction light obtained virtually by vertical and crosswise inversion ("crosswise inversion", "vertical and crosswise inversion", and "vertical inversion" in the figure) can be considered to be simultaneously reproduced with the area "A". That is, the areas "A", "B", "C", and "D" are formed as holograms. To reproduce such a distribution of intensity of diffraction light, the modulation values (interference fringes) to be loaded in the element holograms 61 are obtained by performing a two-dimensional discrete Fourier transform on the distribution of intensity of diffraction light present in the areas "A", "B", "C", and "D" according to the previously mentioned Fourier transform technique.

There is no sine component, however, in the modulation value of the areas "A", "B", "C", and "D" obtained here.

In the end, the two-dimensional Fourier transform on the distribution of intensity in the areas "A" to "D" becomes equivalent to a two-dimensional discrete cosine transform of the distribution of intensity of the area "A". In this case, a distribution obtained by vertical and crosswise inversion is virtually introduced as the distribution of the areas "B", "C", and "D", but the areas "B", "C", and "D" are outside the view scope of the area "A" and therefore there is no problem with the introduction of the areas "B", "C", and "D".

In the above-mentioned two-dimensional discrete cosine transform, all the two-dimensional transform coefficients (modulation values to be loaded) are real numbers. Therefore, when realizing a display device, it is sufficient to modulate only the amplitude and the drive system of the display device is simplified.

Further, the above-mentioned two-dimensional discrete cosine transform corresponds to the generally known orthogonal transform and therefore it can be easily understood that the above-mentioned two-dimensional transform coefficients concentrate at the lower order terms.

Figure 20:
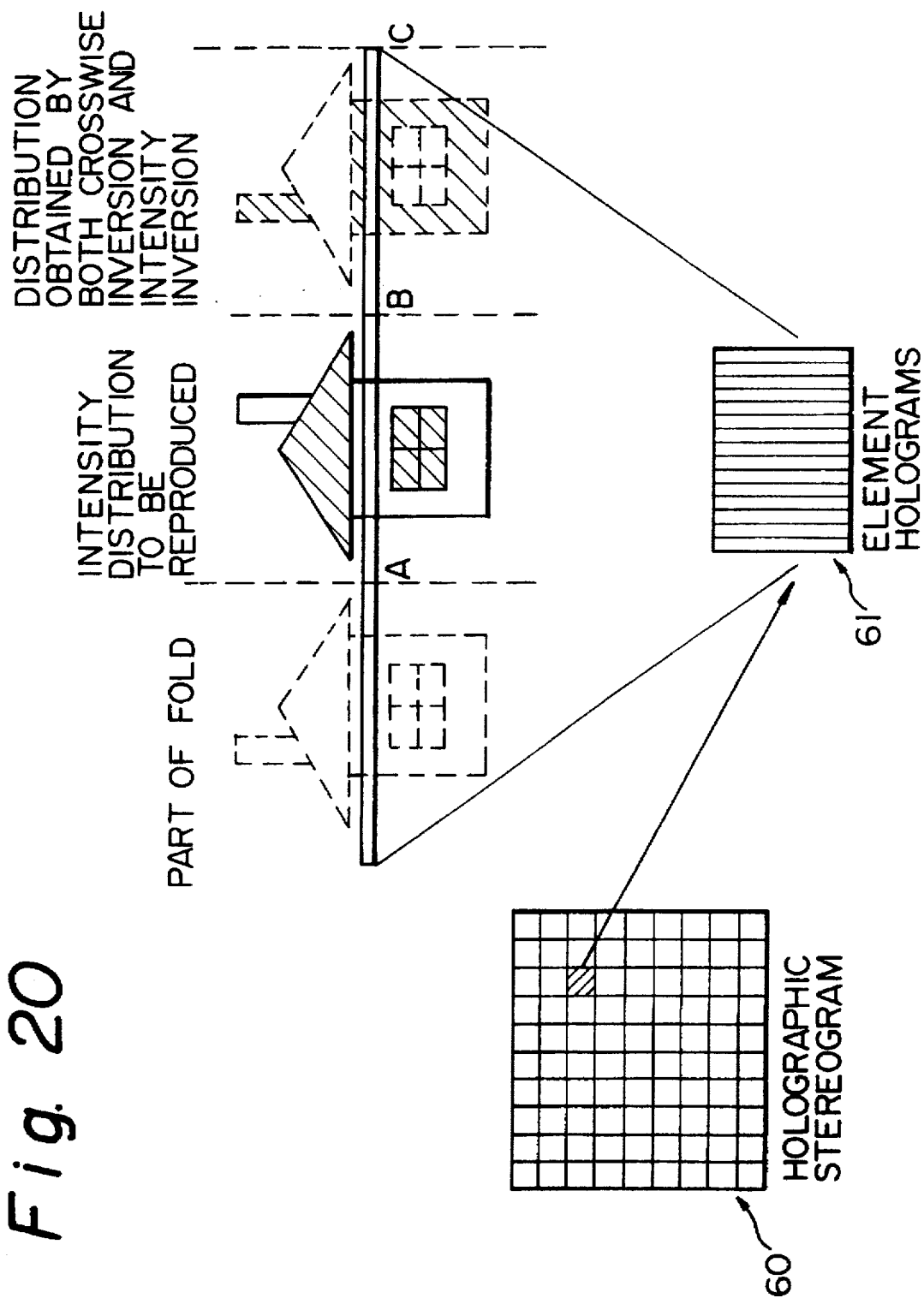
FIG. 20 is a view explaining a computer-generated one-dimensional holographic stereogram according to the third embodiment.
Figure 21:
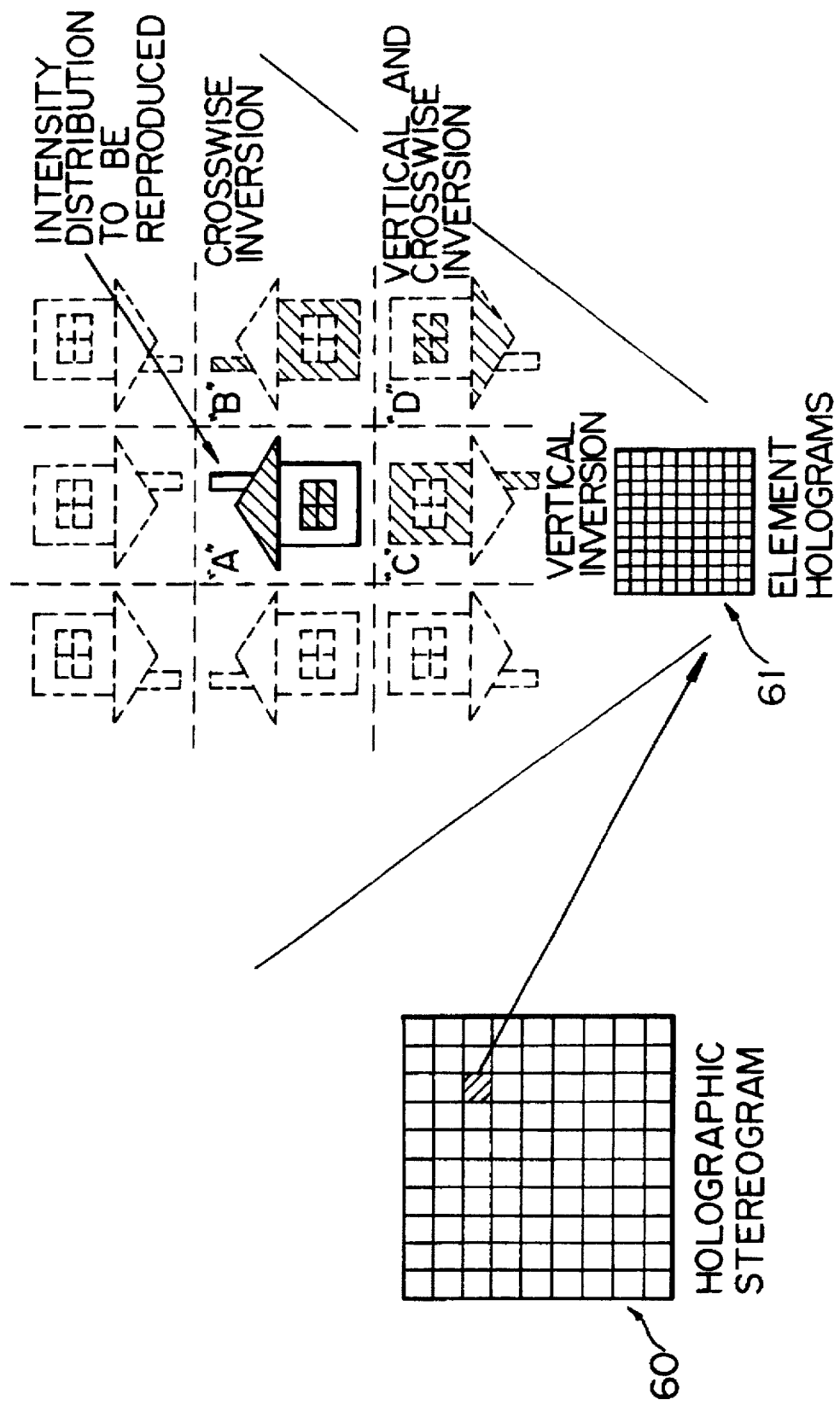
FIG. 21 is a view explaining a computer-generated two-dimensional holographic stereogram according to the third embodiment.

FIG. 20 is a view explaining a computer-generated one-dimensional holographic stereogram according to the third embodiment. Further, FIG. 21 is a view explaining a computer-generated two-dimensional holographic stereogram according to the third embodiment.

Referring first to FIG. 20, the distribution of intensity of diffraction light desired to be reproduced exists in the block AB, but the block BC having a distribution of intensity of diffraction light which is virtually crosswise inverted and intensity inverted ("distribution obtained by both crosswise inversion and intensity inversion" in the figure) can be considered to be simultaneously reproduced with the block AB. That is, the block AC is formed as the hologram. Note that in the figure, to show the intensity inverted image, the light and dark areas of each portion are shown by the presence or absence of hatching. To reproduce such a distribution of intensity of diffraction light, the modulation values (pattern) to be loaded in the element holograms 61 are obtained by performing a Fourier series expansion or a discrete Fourier transform on the distribution of intensity of diffraction light present in the block AB.

There is no cosine component, however, in the modulation value of the block AC obtained here. The reason is that, in FIG. 20, the distribution of the block AC is inverted crosswise and inverted in intensity about the point B. The distribution of the block AC becomes an odd function, so the cosine component in the above-mentioned $e^{jxt}$ (=cosxt+ jsinxt) disappears.

In the end, the Fourier transform on the distribution of intensity in the block AC becomes equivalent to a discrete sine transform of the distribution of intensity in the block AB. In this case, a distribution obtained by both crosswise inversion and intensity inversion is virtually introduced as the distribution of the block BC, but this block BC is outside the view scope of the block AB and therefore there is no problem with the introduction of the block BC.

In the above-mentioned discrete sine transform, all the transform coefficients (modulation values to be loaded) have constant phase, i.e., π/2. Therefore, when realizing a display device, it is sufficient to modulate only the amplitude and the drive system of the display device is simplified. In general, when considering the vector cosθ+jsinθ, unless both the cosθ component and the sinθ component are 0, the phase component (θ) expressed by tanθ(=sinθ/cosθ) appears, so at this time it is necessary to consider not only modulation of the amplitude, but also the modulation of the phase (index of refraction). Since as mentioned above, however, the cosine component is 0, it is sufficient to find the modulation value for only the amplitude.

The above-mentioned discrete sine transform corresponds to the generally known orthogonal transform in image processing techniques and therefore it can be easily understood that the above-mentioned transform coefficients concentrate at the lower order terms. As a result, the aforementioned condition (assumption) that the "point of sight is sufficiently far compared with the size of the element hologram" can be sufficiently satisfied and faithful reproduction of the distribution of intensity of diffraction light becomes possible.

The above applies to the computer-generated two-dimensional holographic stereogram shown in FIG. 21 as well.

Referring first to FIG. 21, the distribution of the intensity of diffraction light desired to be reproduced exists in the area "A", but the areas "B", "C", and "D" having distributions of intensity of diffraction light obtained virtually by vertical and crosswise inversion ("crosswise inversion", "vertical and crosswise inversion", and "vertical inversion" in the figure) can be considered to be simultaneously reproduced with the area "A". That is, the areas "A", "B", "C", and "D" are formed as holograms. Note that the intensity inversion is shown by hatching. To reproduce such a distribution of intensity of diffraction light, the modulation values (interference fringes) to be loaded in the element holograms 61 are obtained by performing a two-dimensional discrete Fourier transform on the distribution of intensity of diffraction light present in the areas "A", "B", "C", and "D" according to the previously mentioned Fourier transform technique.

There is no cosine component, however, in the modulation value of the areas "A", "B", "C", and "D" obtained here.

In the end, the two-dimensional Fourier transform on the distribution of intensity in the areas "A" to "D" becomes equivalent to a two-dimensional sine transform or a two-dimensional discrete sine transform of the distribution of intensity of the area "A". In this case, a distribution obtained by vertical and crosswise inversion and intensity inversion is virtually introduced as the distribution of the areas "B", "C", and "D", but the areas "B", "C", and "D" are outside the view scope of the area "A" and therefore there is no problem with the introduction of the areas "B", "C", and "D".

In the above-mentioned two-dimensional discrete sine transform, all the two-dimensional transform coefficients (modulation values to be loaded) have constant phase, i.e., $\pi/2$. Therefore, when realizing a display device, it is sufficient to modulate only the amplitude and the drive system of the display device is simplified.

Further, the above-mentioned two-dimensional discrete sine transform corresponds to the generally known orthogonal transform and therefore it can be easily understood that the above-mentioned two-dimensional transform coefficients concentrate at the lower order terms.

As mentioned above, a holographic stereogram stands under the condition that the "point of sight is sufficiently far compared with the size of the element hologram". Therefore, when this condition does not stand, the desired distribution of intensity of diffraction light cannot be obtained. Specifically, the high frequency component of the distribution of intensity of diffraction light is lost and the distribution becomes blurred.

Therefore, for the element holograms to reproduce the distribution of intensity of diffraction light as desired, in the present invention, further, compensation is applied in each element hologram so that the degree of modulation of the index of refraction gradually changes along with the increase in distance from the center. Also, if necessary, the amount of composition is revised in accordance with the variation in the distance between the element hologram and the point of sight.

Figure 22:
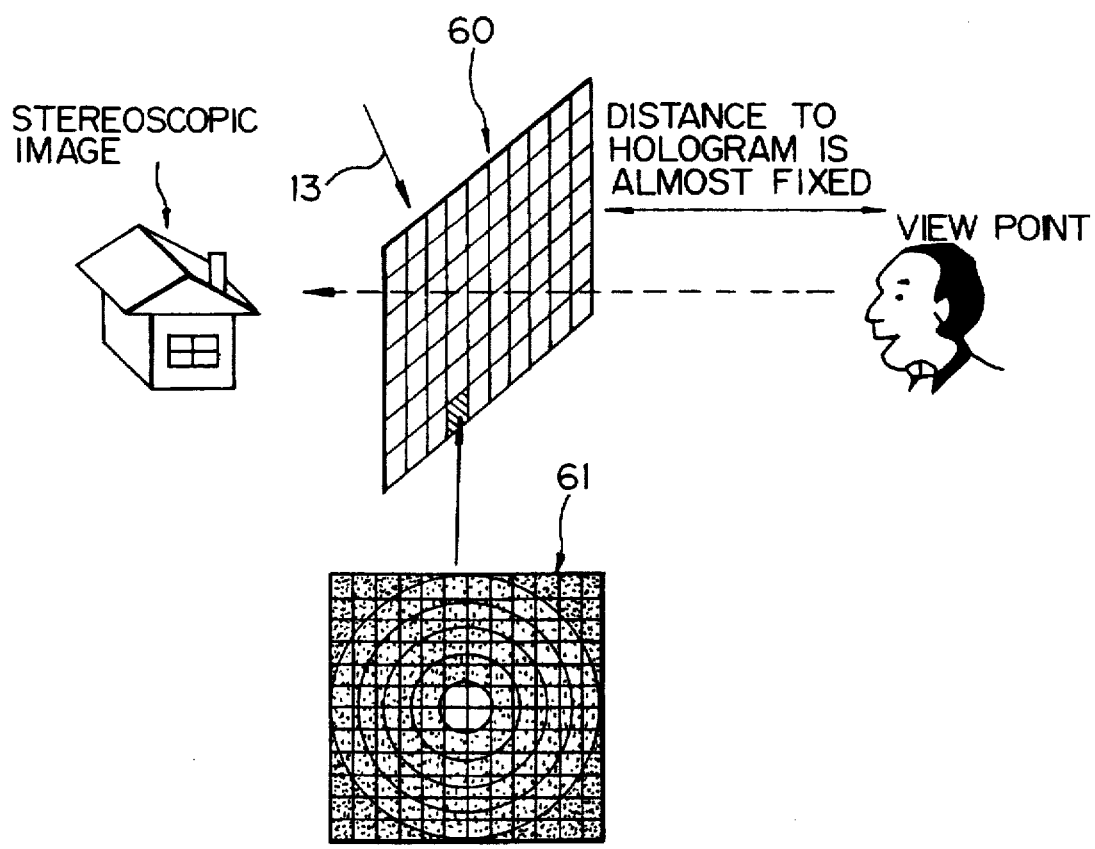
FIG. 22 is a view showing the state of application of compensation of the degree of modulation of the index of refraction for an element hologram.
Figure 23:
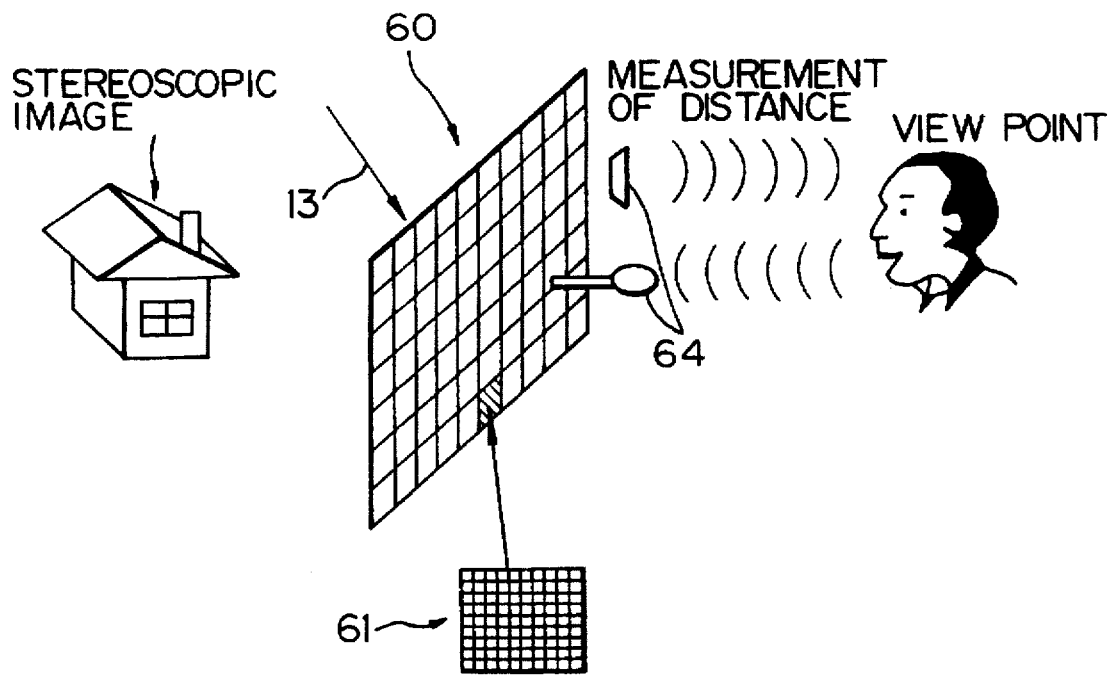
FIG. 23 is a view showing the application of revision to the amount of compensation in accordance with variations in the distance between the element hologram and the point of sight.

FIG. 22 is a view showing the state of application of compensation of the degree of modulation of the index of refraction for an element hologram, while FIG. 23 is a view showing the application of revision to the amount of compensation in accordance with variations in the distance between the element hologram and the point of sight.

As mentioned above, by revising the degree of modulation at each element hologram by a value depending on the distance from the center of the element hologram to the point where a transform is performed on the actually incident coherent light 13 and the distance from the element hologram to the point of sight, it is possible to realize a holographic stereogram which enables faithful reproduction of the distribution of intensity of diffraction light up to the high frequency component. This will be explained in detail below.

First, the value for modulating the incident coherent light is shifted from the value found by performing a Fourier transform (same with cosine transform and sine transform) on the points of the element hologram by exactly the multiple of $\exp(jkx^2/2L)$ where, j: complex unit x: distance of coefficient from center of element hologram k: number of waves of incident coherent light L: distance from element hologram to point of sight This is explained below.

FIG. 24 is a view explaining the compensation of the degree of modulation of the index of refraction.

Consider the element hologram 61 of the holographic stereogram shown in FIG. 24. The angle of incidence of the coherent light to the element hologram 61 is $\phi$. Consider that the distribution (n(x)) of degree of light modulation of the element hologram causes diffraction with the distribution of light intensity of $I(\theta)$ on a circular screen exactly a distance L from the center O of the element hologram.

Here, the light path difference at a point Q ($\theta=\theta_0$) on the circular screen in the case of light diffracted at the point O (x=0) and the point P (x=$x_0$) is found.

First, the light path difference $l_1$ of the light 13 incident at the point 0 and the point P becomes $l_1 = x_0 \cdot \sin\phi$ Further, the light path difference $l_2$ of (OQ-PQ) is $$l_2 = OQ - PQ$$
$$= L - (L^2 + x_0^2 - 2x_0 \cdot L \cdot \sin\theta_0)^{1/2}$$
$$= x_0 \cdot \sin\theta_0 - x_0^2/2L$$

therefore, the total light path difference 1 becomes $$l = l_1 - l_2$$
$$= x_0 \cdot \sin\phi - x_0 \cdot \sin\theta_0 + x_0^2/2L$$

From this, the light intensity measured at the point Q becomes as follows by using as the wave number of the incident coherent light and integrating the light from the entire surface of the element hologram 61:

$$I(\theta_0) = \int n(x) \cdot \exp(-jk(x \cdot \sin\phi - x \cdot \sin\theta_0 + x^2/2L)) \cdot dx$$
$$= \int n(x) \cdot \exp(-jkx^2/2L) \cdot \exp(-jk(\sin\phi - \sin\theta_0)x) \cdot dx$$

Here, if the following variable transform is performed:

$\Xi = \sin\phi - \sin\theta_0$ then $$I(\Xi) = \int n(x) \cdot \exp(-jkx^2/2L) \cdot \exp(-jk\Xi x) \cdot dx$$

and it is learned that $I(\Xi)$ becomes the inverse Fourier transform of $n(x) \cdot \exp(-jkx^2/2L)$. From this, the term $n(x) \cdot \exp(-jkx^2/2l)$ is the Fourier transform of $I(\Xi)$. That is, $$n(x) \cdot \exp(-jkx^2/2L) = \int I(\Xi) \cdot \exp(jk\Xi x) \cdot d\Xi$$

From the above, the distribution of the degree of modulation of light intensity of the element hologram for reproducing the desired distribution of intensity of diffraction light becomes $$n(x) = \exp(jkx^2/2L) \cdot \int I(\Xi) \cdot \exp(jK\Xi x) \cdot d\Xi$$

Compensation Fourier transform of desired distribution of intensity of diffraction light The compensation term is multiplied with the Fourier transform (same for cosine transform and sine transform) of the desired distribution of intensity of diffraction light. Note that the above discussion stands similarly in both the one-dimensional and two-dimensional cases.

As seen in the above final equation, the value of the compensation term depends only on the distance x from the center of the element hologram and the distance L from the center of the element hologram to the point of sight (view point) and is not dependent on the viewing angle $\theta$. This fact is true in the case of using a two-dimensional Fourier transform (two-dimensional cosine transform and two-dimensional sine transform) as well. Further, this compensation value is only the phase component. This means that in actuality it is sufficient to change only the light path difference in the display device 12, that is, the index of refraction. From this, to reproduce the desired distribution of intensity of diffraction light, it is sufficient to apply the following compensation.

First, consider the case where the position of the point of sight of the observer from the hologram is substantially constant. In this case, in the above-mentioned compensation term, L is substantially fixed, so the compensation term depends on only the value from the center of the element hologram. That is, it can be calculated in advance. Therefore, it is possible to either change the index of refraction by exactly the light path difference with respect to the calculated modulation value or to install in the display device (60) from the start an index of refraction which realizes this light path difference (FIG. 22).

Further, when the point of sight of the observer changes, it is possible to use an ultrasonic sensor 64 etc. and measure the distance from the hologram (60) to the observer's head, calculate a compensation value calculated in accordance with this distance, and multiply it with the value found by the Fourier transform (FIG. 23).

Using the above method, it is possible to obtain the desired distribution of intensity of diffraction light and it is possible to realize a holographic stereogram which can be faithfully reproduced up to the high frequency components.

As explained above, according to the present invention, since the two pieces of hardware which in the prior art had been independently and separately provided at the transmission side, that is, the information source coding means 4 and the interference fringe generating means (8, 10), are combined into a single piece of hardware, that is, the image processing means 20, the size of the hardware of the system as a whole can be reduced.

Further, by constructing the image processing means 20 by the discrete Fourier transform unit (31, 32), discrete cosine transform unit (41, 42), or discrete sine transform unit (51, 52), it is possible to eliminate the information source decoding means 7 from the conventional reception side and the size of the hardware of the system as a whole can be reduced considerably. In this case, if use is made of a discrete cosine transform unit or discrete sine transform unit, a much higher information compression efficiency can be achieved than with the case of use of the Fourier transform unit.

Further, the above transform units (31, 32, 41, 42, 51, 52) are known as so-called orthogonal transforms in the general image processing technology. It is also possible to lighten the burden placed on the transmission lines 3 while performing transforms with a high efficiency of information compression.

We claim:

1. A stereoscopic image information transmission system having a transmission side and a reception side connected by a transmission line, comprising:

an image information processing means, at the transmission side, for both coding at the transmission side three-dimensional image information or multiple-lens image information to be transmitted and generating an interference fringe information corresponding to the said three-dimensional image information or multiple-lens image information to be reproduced at the reception side, based on a conversion rule which is one selected from a cosine transformation or a sine transformation effective for image compression;

communication path coding means, at the transmission side, receiving the output from said image information processing means, for producing band compressed output information to the transmission line;

a communication path decoding means, at the reception side, for receiving through the transmission line the band compressed output information and restoring it to the original band;

said stereoscopic image information transmission system excluding any information source decoding means at the reception side since information output from the communication path decoding means constitutes the stereoscopic image information to be loaded on a holographic stereogram.

2. A stereoscopic image information transmission system as set forth in claim 1, wherein said image information processing means generates one-dimensional or two-dimensional discrete cosine transformation or sine transformation coefficients to be located in said holographic stereogram one-dimensionally or two-dimensionally.

3. A stereoscopic image information transmission system as set forth in claim 2, wherein an information source compression coding unit which performs information compression, using the correlation of the image information, on information output from said image information processing means is provided at the input side of said communication path coding means.

4. A stereoscopic image information transmission system as set forth in claim 2, wherein in each of a plurality of element holograms constituting said holographic stereogram, compensation is applied in advance so that the degree of modulation of the index of refraction gradually changes along with the increase of the distance from the center.

5. A stereoscopic image information transmission system as set forth in claim 1, wherein said image information processing means is comprised by a discrete cosine transform unit which performs a one-dimensional or two-dimensional discrete cosine transform on the said three-dimensional or multiple-lens image information and generates one-dimensional or two-dimensional discrete cosine transform coefficients to be loaded in said holographic stereogram one-dimensionally or two-dimensionally.

6. A stereoscopic image information transmission system as set forth in claim 5, wherein an information source compression coding unit which performs information compression, using the correlation of the image information, on information output from said discrete cosine transform unit is provided at the input side of said communication path coding means.

7. A stereoscopic image information transmission system as set forth in claim 5, wherein in each of a plurality of element holograms constituting said holographic stereogram, compensation is applied in advance so that the degree of modulation of the index of refraction gradually changes along with the increase of the distance from the center.

8. A stereoscopic image information transmission system as set forth in claim 1, wherein said image information processing means is comprised by a discrete sine transform unit which performs a one-dimensional or two-dimensional discrete sine transform on the said three-dimensional or multiple-lens image information and generates one-dimensional or two-dimensional discrete sine transform coefficients to be loaded in said holographic stereogram one-dimensionally or two-dimensionally.

9. A stereoscopic image information transmission system as set forth in claim 8, wherein an information source compression coding unit which performs information compression, using the correlation of the image information, on information output from said discrete sine transform unit is provided at the input side of said communication path coding means.

10. A stereoscopic image information transmission system as set forth in claim 8, wherein in each of a plurality of element holograms constituting said holographic stereogram, compensation is applied in advance so that the degree of modulation of the index of refraction gradually changes along with the increase of the distance from the center.

11. A stereoscopic image information transmitting, receiving and displaying system comprising:

multiple-lens image obtaining means for obtaining a plurality of images seen stereoscopically from multiple viewpoints on a certain plane;

an image conversion means for removing the image correlations between plural sets of information in each image obtained by said multiple-lens image obtaining means and producing image conversion signals for each of said multiple-lens images by converting the form of the image signals needed for displaying a target three-dimensional picture at the reception side based on a conversion rule which is one selected from a cosine transformation or a sine transformation effective for image compression;

an information compression means for producing stereoscopic image compression signals by further suppressing the information amount of the image conversion signals output from said image conversion means by utilizing an image correlation between said image conversion signals of each image;

a coding means for assigning suitable codes to each of said stereoscopic image compression signals;

a transmission means for transmitting said codes from said coding means;

a decoding means for decoding said codes transmitted from said transmission means so as to reproduce the original stereoscopic image compression signals before coding;

an image conversion signal reproducing means for obtaining image conversion signals for each of said images from said stereoscopic image compression signals decoded by said decoding means;

an optical modulation means comprised of light intensity modulation elements able to modulate the light intensity at respective small areas on a plane in response to respective signals input from said image conversion signal reproducing means; and a stereoscopic display device being constructed by arranging a plurality of said optical modulation means at respective positions corresponding to the positions from which each of said multiple-lens images is obtained by said multiple-lens image obtaining means.

12. A system as set forth in claim 11, wherein said conversion rule performed by said image conversion means is a discrete cosine transform.

13. A system as set forth in claim 11, wherein said conversion rule performed by said image conversion means is a discrete sine transform.

14. A system as set forth in claim 11, where said multiple-lens image obtaining means is constructed by cameras for taking photographs of an object.

15. A system as set forth in claim 11, wherein said multiple-lens image obtaining means is constructed by a computer for generating three-dimensional image data indicating stereoscopic image information of an object.

16. A system as set forth in claim 11, wherein said information compression means performs a discrete cosine transform to produce a transform coefficient of each of said image conversion signals by utilizing a correlation between transform coefficients of the corresponding multiple-lens images.

* * * * *